United States Patent
Draper et al.

(10) Patent No.: US 10,802,698 B1
(45) Date of Patent: Oct. 13, 2020

(54) DIAGRAMS FOR STRUCTURED DATA

(71) Applicant: LUCID SOFTWARE, INC., South Jordan, UT (US)

(72) Inventors: Paul Darren Draper, West Valley City, UT (US); Anthony T. Morelli, Salt Lake City, UT (US); David Lind Torgerson, Herriman, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 355 days.

(21) Appl. No.: 15/425,486

(22) Filed: Feb. 6, 2017

(51) Int. Cl.
| | |
|---|---|
| *G06F 3/0486* | (2013.01) |
| *G06T 11/20* | (2006.01) |
| *G06F 3/0481* | (2013.01) |
| *G06F 3/0482* | (2013.01) |
| *G06F 3/0484* | (2013.01) |
| *G06F 40/14* | (2020.01) |
| *G06F 40/117* | (2020.01) |

(52) U.S. Cl.
CPC .......... *G06F 3/0486* (2013.01); *G06F 3/0482* (2013.01); *G06F 3/04817* (2013.01); *G06F 3/04847* (2013.01); *G06F 40/117* (2020.01); *G06F 40/14* (2020.01); *G06T 11/206* (2013.01)

(58) Field of Classification Search
CPC .. G06F 17/2247; G06F 17/218; G06F 3/0486; G06F 3/04847; G06F 3/04817; G06F 3/0482; G06F 40/14; G06F 40/117; G06T 11/206
See application file for complete search history.

(56) References Cited

U.S. PATENT DOCUMENTS

| | | | | |
|---|---|---|---|---|
| 5,394,522 A | * | 2/1995 | Sanchez-Frank | ....... H04L 29/00 715/735 |
| 6,393,425 B1 | | 5/2002 | Kelly | |
| 7,496,594 B1 | * | 2/2009 | Cummings | ............. G06F 9/451 |
| 2002/0059183 A1 | | 5/2002 | Chen | |
| 2007/0214179 A1 | | 9/2007 | Hoang | |
| 2009/0228830 A1 | * | 9/2009 | Herz | ....................... G06F 16/26 715/808 |
| 2011/0016099 A1 | | 1/2011 | Peer et al. | |
| 2011/0055756 A1 | | 3/2011 | Chen et al. | |
| 2011/0078171 A1 | | 3/2011 | Wagenblatt et al. | |
| 2012/0174013 A1 | * | 7/2012 | Kraus | .................. G06Q 10/063 715/771 |

(Continued)

OTHER PUBLICATIONS

International Search Report dated Jun. 6, 2018 as received in Application No. PCT/US2018/017105.

(Continued)

*Primary Examiner* — Daniel W Parcher
(74) *Attorney, Agent, or Firm* — Maschoff Brennan

(57) ABSTRACT

A method to filter a graphical diagram may include displaying a graphical diagram of multiple nodes and their relationships based on structured data about the nodes and their relationships. The method may also include receiving input effective to specify a filter parameter. The method may also include analyzing the nodes displayed in the graphical diagram to identify a first subset of the nodes that satisfy the filter parameter and a second subset of the nodes that fail to satisfy the filter parameter. The method may also include altering the graphical diagram in accordance with the filter parameter.

22 Claims, 15 Drawing Sheets

(56) References Cited

U.S. PATENT DOCUMENTS

| | | | |
|---|---|---|---|
| 2012/0185762 A1* | 7/2012 | Ozer | G06F 17/2288 |
| | | | 715/229 |
| 2013/0232452 A1 | 9/2013 | Krajec et al. | |
| 2014/0006421 A1 | 1/2014 | Van Ham | |
| 2014/0195515 A1 | 7/2014 | Baker et al. | |
| 2014/0279979 A1* | 9/2014 | Yost | G06F 16/904 |
| | | | 707/695 |
| 2015/0085641 A1* | 3/2015 | Cecil | H04L 41/0663 |
| | | | 370/223 |
| 2015/0193957 A1* | 7/2015 | Dilts | G06F 3/04812 |
| | | | 345/634 |
| 2015/0294488 A1 | 10/2015 | Iwasaki et al. | |
| 2015/0339379 A1 | 11/2015 | Inagaki | |
| 2015/0363702 A1* | 12/2015 | Baum | G06N 5/048 |
| | | | 706/52 |
| 2016/0179339 A1* | 6/2016 | Ponce Portugal | G06F 3/04817 |
| | | | 345/440 |
| 2017/0039576 A1* | 2/2017 | Gauthier | G06Q 30/0201 |
| 2018/0157579 A1* | 6/2018 | Rozenberg | G06F 11/3612 |

OTHER PUBLICATIONS

Written Opinion of the International Searching Authority dated Jun. 6, 2018 as received in Application No. PCT/US2018/017105.

* cited by examiner

DIAGRAMS FOR STRUCTURED DATA

FIELD

Some embodiments described herein generally relate to diagrams for structured data.

BACKGROUND

Unless otherwise indicated herein, the materials described herein are not prior art to the claims in the present application and are not admitted to be prior art by inclusion in this section.

Some structured data, e.g., of networks, organizations, or the like, lends itself to representation in the form of a diagram, such as a network diagram or an organizational chart. Some diagram applications allow users to generate diagrams on a computer based on the structured data. Sometimes the underlying structured data may be updated and a user may desire the updates to be reflected in the diagram. One existing option to update the diagram includes generating the diagram again from scratch based on the updated structured data, which can be bothersome and/or time-consuming when the diagram includes many nodes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to filter a graphical diagram may include displaying a graphical diagram of multiple nodes and their relationships based on structured data about the nodes and their relationships. The method may also include receiving input effective to specify a filter parameter. The method may also include analyzing the nodes displayed in the graphical diagram to identify a first subset of the nodes that satisfy the filter parameter and a second subset of the nodes that fail to satisfy the filter parameter. The method may also include altering the graphical diagram in accordance with the filter parameter.

In another example embodiment, a method to update a graphical diagram may include displaying an initial graphical diagram of multiple nodes and their relationships based on an initial version of structured data about the nodes and their relationships. The method may also include determining that a current version of the structured data is updated compared to the initial version of the structured data with respect to at least one of the nodes or the relationships. The method may also include, in response to determining that the current version of the structured data is updated compared to the initial version of the structured data, outputting an indication that the initial graphical diagram of the multiple nodes and their relationships is outdated.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DETAILED DESCRIPTION OF SOME EXAMPLE EMBODIMENTS

Embodiments described herein generally relate to techniques for customizing content in documents. The customization of the content may be performed by a server serving content to a browser, a native app on a smartphone or other mobile device, or another suitable application. Alternately or additionally, the customization of the content may be performed by the browser, the native app on the smartphone or other mobile device, or another suitable application. For example, a browser (or an app) on a client device may be used to receive a document and customize content in the document for a user associated with the client device.

Some embodiments described herein may allow customizing a rendering of a document for different users. For example, different users may receive a common document respectively. Depending on user inputs provided by the different users during the respective rendering of the common document, user types related to the different users may be determined. Different pages and/or different layers on pages of the common document may be rendered on client devices associated with the different users based on the corresponding user types. In these and other embodiments, each user may be presented with different content in the common document based on a corresponding user input and/or other customization data associated with the corresponding user. In some embodiments, a user may provide a user input at a branch point of the document. Layers to be rendered on subsequent pages after the branch point may depend on the user input provided at the branch point.

Some embodiments described herein may also allow customizing a common document for different users using different links. For example, user types of the different users may be known in advance before the document customization. Different links may be created for the different users based on the corresponding user types and/or other customization data associated with the different users. The different links may point to the common document. The different links may be respectively distributed to client devices associated with the different users using electronic mail merge. A user receiving a link may select the link to view the common document, causing the common document to be customized for the user based on the corresponding link. As a result, different content in the common document may be presented to different users based on the corresponding links received by the different users.

Reference will now be made to the drawings to describe various aspects of some example embodiments of the invention. The drawings are diagrammatic and schematic representations of such example embodiments, and are not limiting of the present invention, nor are they necessarily drawn to scale.

Figure 1:
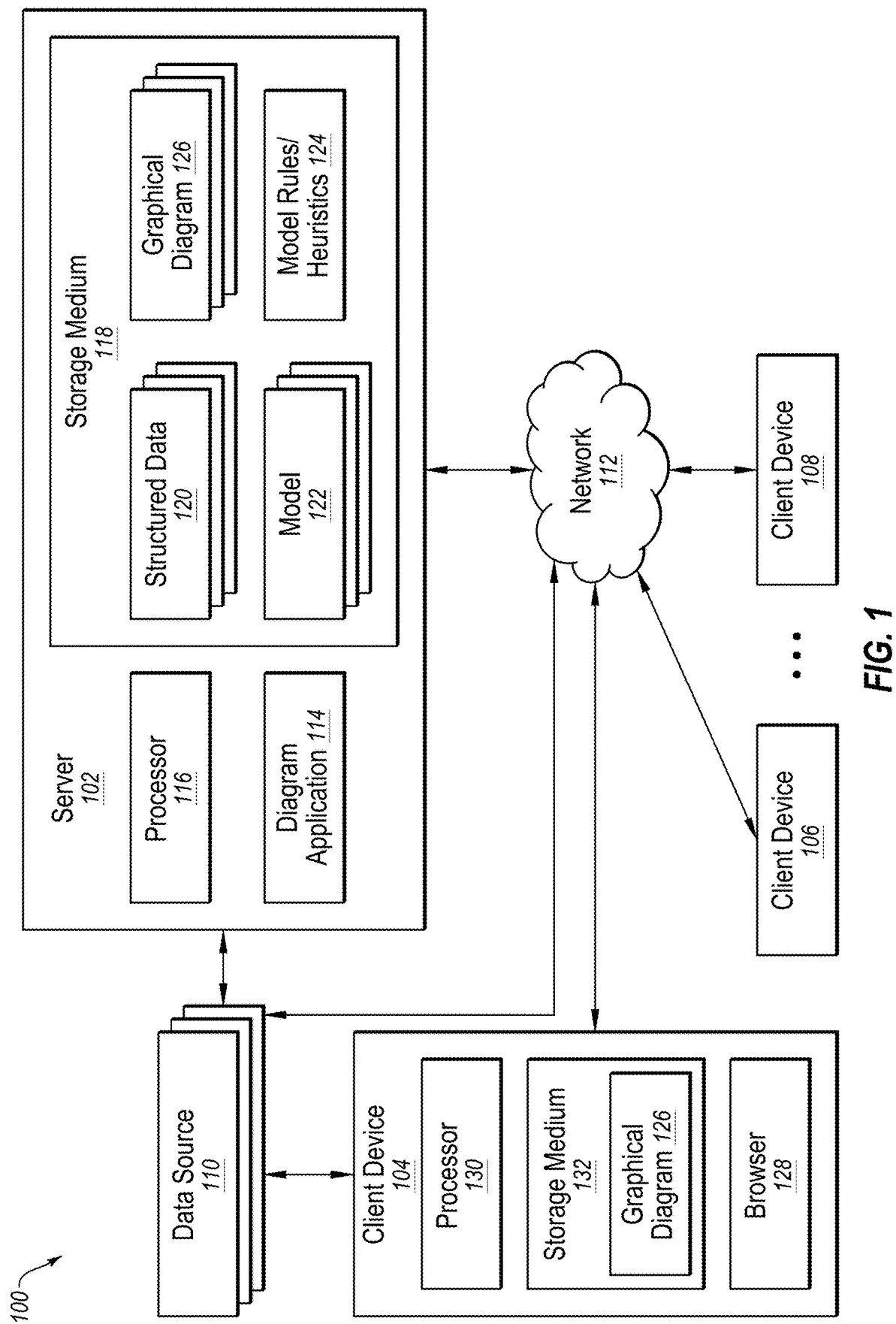
FIG. 1 is a block diagram of an example operating environment that includes a server and one or more client devices.

FIG. 1 is a block diagram of an example operating environment 100 that includes a server 102 and one or more client devices 104, 106, 108, arranged in accordance with at least some embodiments described herein. The server 102 and/or the client devices 104, 106, 108 may be configured to generate, filter, and/or update graphical diagrams based on structured data. Alternatively or additionally, the structured data may be updated based on changes to the graphical diagrams.

The structured data may be received from one or more data sources 110. The one or more data sources 110 may include a human resources (HR) database, AMAZON Web Services (AWS), another cloud infrastructure provider (e.g., GOOGLE Cloud Platform, MICROSOFT AZURE), a database schema (e.g., to generate Entity Relationship Diagrams), a service-oriented architecture, physical network discovery tools, custom-built technical systems that can be modeled similar to a network, or other data source of structured data. The structured data may identify two or more nodes or other entities and relationships among them. For instance, the structured data may identify employees, executives, owners and/or other personnel of a company as well as their relationships to each other, such as relative ranks and organization into one or more divisions, departments, or other logical units. As another example, the structured data may identify various compute nodes, storage nodes, database nodes, networking nodes, and/or other entities deployed by a customer in AWS as well as relationships among the entities, such as specific ports over which specific nodes can communicate. As another example, the structured data may identify databases and tables within databases and/or other entities in a database schema as well as relationships among the entities, such as foreign and/or primary keys.

Data sources 110 such as AWS and/or other data sources 110 may allow users to tag nodes or other entities represented by the corresponding structured data. Examples of tags that may be provided by users for nodes represented by the structured data of the data source 110 may include names, categories, cost, launch date, or other tags. The tags may be stored as part of the structured data of the data source 110. In some embodiments, the tags may be used to filter graphical diagrams generated based on the structured data of the data source 110.

Although one server 102 and three client devices 104, 106, 108 are illustrated in FIG. 1, the operating environment 100 may more generally include one or more servers 102 and one or more client devices 104, 106, 108. In these and other embodiments, the operating environment 100 may include other servers and/or devices not illustrated in FIG. 1.

The operating environment 100 may additionally include a network 112. In general, the network 112 may include one or more wide area networks (WANs) and/or local area networks (LANs) that enable the server 102, the client devices 104, 106, 108, and the data sources 110 to communicate with each other. In some embodiments, the network 112 may include the Internet, including a global internetwork formed by logical and physical connections between multiple WANs and/or LANs. Alternately or additionally, the network 112 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 112 may also include servers that enable one type of network to interface with another type of network.

In general, the server 102 may host a web-based diagram application ("application 114") that allows the client devices 104, 106, 108 to generate, filter, and/or update graphical diagrams as described herein. In other embodiments, the application 114 may include a non-web-based application but may generally be described herein as a web-based application for simplicity. Alternately or additionally, the server 102 may facilitate updates to structured data based on changes to the graphical diagrams. For instance, a user may manually add a node to a graphical diagram and/or change a relationship between two nodes and such changes may be pushed from the graphical diagram into the structured data from which the graphical diagram was originally generated.

The server 102 may additionally include a processor 116 and a storage medium 118. The processor 116 may be of any type such as a central processing unit (CPU), a microprocessor (μP), a microcontroller (μC), a digital signal processor (DSP), or any combination thereof. The processor 116 may be configured to execute computer instructions that, when executed, cause the processor 116 to perform or control performance of one or more of the operations described herein with respect to the server 102.

The storage medium 118 may include volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 118 may store computer instructions that may be executed by the processor 116 to perform or control performance of one or more of the operations described herein with respect to the server 102.

The storage medium 118 may additionally store one or more sets of structured data 120, one or more models 122, model rules and/or heuristics 124 ("Model Rules/Heuristics" in FIG. 1), and/or one or more graphical diagrams 126. Each set of structured data 120 may be imported from a corresponding one of the data sources 110. The structured data 120 may be imported over the network 112 or directly from the corresponding data source 110 if a direct connection exists.

The model rules and/or heuristics 124 include rules and/or heuristics that may be applied to the structured data 120 to derive information about the nodes and/or their relationships represented in the structured data. The structured data 120 and/or the information derived by the model rules and/or heuristics 124 may be used by the server 102 to generate the models 122, each model 122 corresponding to a different set of structured data 120. Each of the graphical diagrams 126 may be generated directly from a corresponding set of the structured data 120 and/or from a corresponding one of the models 122 derived from the corresponding set of structured data 120. The graphical diagrams 126 may be generated based on input received from users at the client devices 104, 106, 108 and may include some or all of the nodes or other entities represented in the corresponding set of structured data 120 and/or in the corresponding model 122 derived from the corresponding set of structured data 120.

Structured data at the data sources 110 may undergo changes over time. As such, the server 102 may from time to time import an updated version of a corresponding set of structured data 120 from the corresponding data source 110. The model rules and/or heuristics 124 may be applied to the updated version of the corresponding set of structured data 120 to generate a corresponding updated model 122. The server 102 may compare the prior version of the structured data 120 with the updated version of the structured data 120 to identify one or more changes between the two. The identified changes may be saved in the storage medium 118.

Alternatively or additionally, the server 102 may analyze a corresponding one of the graphical diagrams 126 to determine whether the identified changes affect the graphical diagram 126. If it is determined that at least one of the identified changes affect the graphical diagram 126, the server 102 may generated an updated version of the graphical diagram 126 with the corresponding changes and/or may flag or otherwise identified the graphical diagram 126 as being outdated or out of synchronization with the updated version of the structured data 120. On the other hand, in some embodiments, if it is determined that none of the identified changes affect the graphical diagram 126, the graphical diagram 126 may be flagged or otherwise identified as being up-to-date or in synchronization with the updated version of the structured data 120.

In some embodiments, the server 102 may be configured to cooperate with the client devices 104, 106, 108 to allow the client devices 104, 106, 108 to generate, filter, and/or update graphical diagrams 126 based on the structured data 120. Generating, filtering, and/or updating graphical diagrams 126 based on the structured data 120 may include generating, filtering, and/or updating the graphical diagrams 126 based directly on the structured data 120 and/or based on the models 122 derived from the structured data 120. In these and other embodiments, client devices 104, 106, 108 may use a corresponding application or app, such as a browser 128, to generate the graphical diagrams 126, which may be displayed on a display of the corresponding client device 104, 106, 108.

Accordingly, each of the client devices 104, 106, 108 may execute an application, such as the browser 128, configured to communicate through the network 112 with the server 102. Each of the other client devices 119, 121 may be similarly configured to execute a browser, such as the browser 128. The browser 128 may include an Internet browser or other suitable application for communicating through the network 112 with the server 102. The browser 128 may generate, download and/or interact with structured data 120 and/or graphical diagrams 126. Each of the client devices 104, 106, 108 may include a desktop computer, a laptop computer, a tablet computer, a mobile phone, a smartphone, a personal digital assistant (PDA), a wearable device (e.g., a smart watch), or another suitable client device.

Each of the client devices 104, 106, 108 may additionally include a processor and a storage medium, such as a processor 130 and a storage medium 132 as illustrated for the client device 104 in FIG. 1. Each of the other client devices 106, 121108 may be similarly configured. Similar to the processor 116 of the server 102, the processor 130 may be of any type such as a CPU, a μP, a μC, a DSP, or any combination thereof. The processor 130 may be configured to execute computer instructions that, when executed, cause the processor 130 to perform or control performance of one or more of the operations described herein with respect to the client device 104 and/or the browser 128.

Similar to the storage medium 118 of the server 102, the storage medium 132 of the client device 104 may include volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 132 may store computer instructions that may be executed by the processor 130 to perform one or more of the operations described herein with respect to the client device 104 and/or the browser 128. The storage medium 132 may additionally store, at least temporarily, a graphical diagram 126, some of a corresponding set of structured data 120 or model 122, and/or other content obtained from the server 102 and/or created locally on the client device 104.

Embodiments described herein are not limited to using a browser to communicate with the server 102 to generate, filter, and/or update graphical diagrams. For example, rather than or in addition to a browser, the client devices 104, 106, 108 may include a native app as are often used on client devices such as mobile devices including smartphones and tablet computers. Accordingly, embodiments described herein generally include generating, filtering, and/or updating graphical diagrams using a browser, a native app, or another suitable application on the client devices 104, 106, 108.

Figure 2:
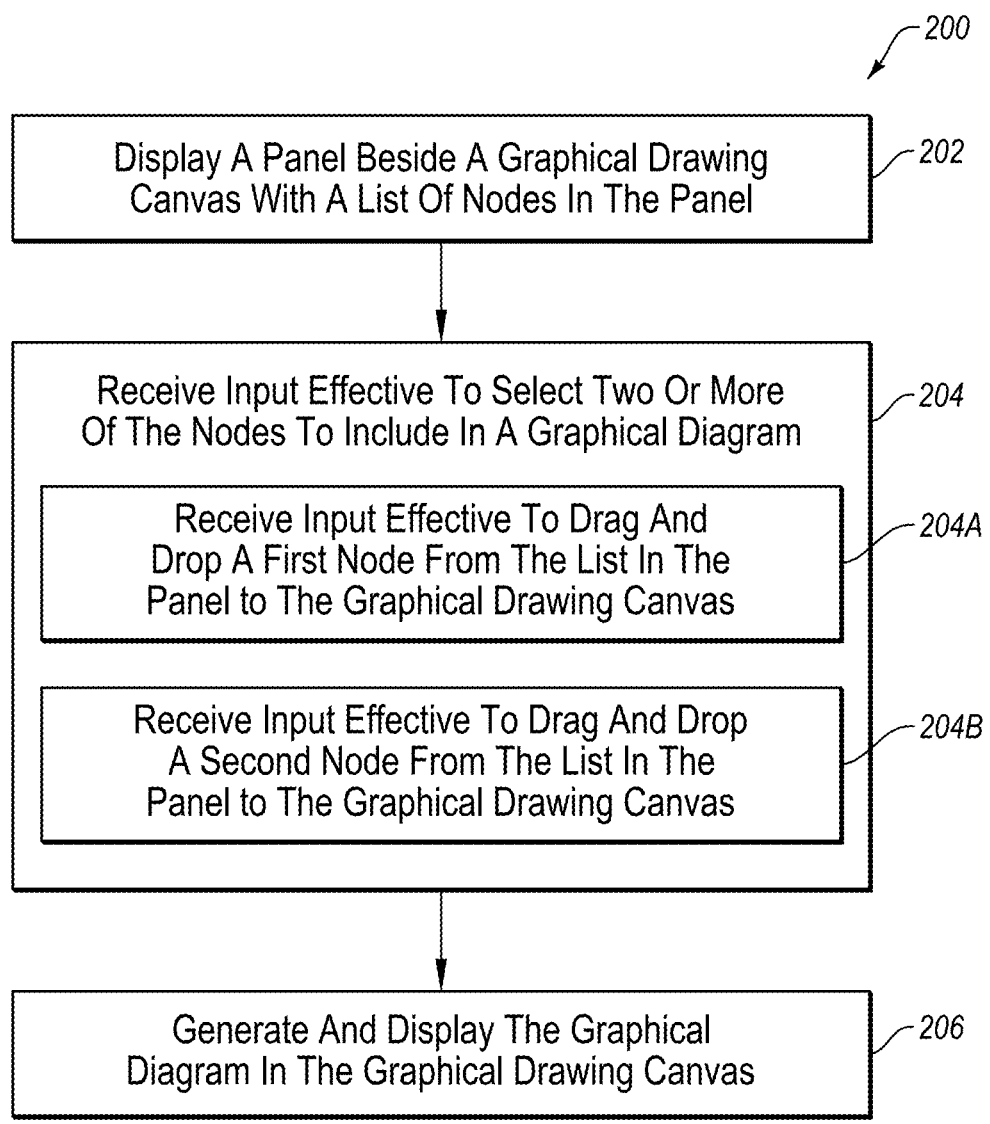
FIG. 2 is a flowchart of a method to generate a graphical diagram based on structured data.

FIG. 2 is a flowchart of a method 200 to generate a graphical diagram based on structured data, arranged in accordance with at least one embodiment described herein. The method 200 may be programmably performed or controlled by a processor in, e.g., a computer and/or server that executes a browser, diagram application, and/or other application to generate graphical diagrams based on structured data. In an example implementation, the method 200 may be performed in whole or in part by the server 102 and/or the client device 104 of FIG. 1. The method 200 may include one or more of blocks 202, 204, and/or 206.

At block 202, the method 200 may include displaying a panel beside a graphical drawing canvas with a list of nodes in the panel. For instance, the client device 104 of FIG. 1 may display the panel and the graphical drawing canvas in the browser 128 on a display of the client device 104. The nodes may be represented by and/or identified in the structured data 120. The client device 104 may import the structured data 120 from the data source 110. Alternatively, the server 102 may import the structured data 120 from the data source 110 and/or may derive the corresponding model 122, where the server 102 may send the client device 104 the list of nodes and/or their relationships based on the structured data 120 and/or the model 122. Block 202 may be followed by block 204.

At block 204, the method 200 may include receiving input effective to select two or more of the nodes to include in a graphical diagram. For instance, the client device 104 may receive user input, such as drag-and-drop mouse input or other input, that is effective to select the two or more nodes from the panel to include in the graphical diagram on the graphical drawing canvas. Receiving the input effective to select the two or more nodes to include in the graphical diagram at block 204 may include, at sub-block 204A, receiving input effective to drag and drop a first node from the list in the panel to the graphical drawing canvas. Receiving the input effective to select the two or more nodes to include in the graphical diagram at block 204 may also include, at sub-block 204B, receiving input effective to drag and drop a second node from the list in the panel to the graphical drawing canvas. The structured data 120 (including the structured data 120 itself or the model 122 derived from the structured data 120) may indicate that the second node is related to the first node. Block 204 may be followed by block 206.

At block 206, the method 200 may include generating and displaying the graphical diagram in the graphical drawing canvas, including generating and displaying the first node as a first icon, the second node as a second icon, and a connection between the first icon and the second icon as a representation that the second node is related to the first node.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For instance, the method 200 may be combined with one or more other methods and processes described herein.

Moreover, some or all of the functions or blocks described in this and other processes and methods may be implemented by one or more processors executing computer-readable instructions stored on one or more non-transitory computer-readable media. Execution by the processors of the computer-readable instructions may cause the processors to perform or control performance of the functions or blocks. The one or more processors may include the processor 116 of the server 102 of FIG. 1, the processor 130 of the client device 104, and/or one or more other processors of one or more other devices. The non-transitory computer-readable media may include one or more non-transitory computer-readable media included in or accessible to the foregoing computer or server, such as the storage medium 118 of the server 102, the storage medium 132 of the client device 104, and/or one or more other storage media of one or more other devices. The computer-readable instructions may include one or more of the diagram application 114 of the server 102, the browser 128 of the client device 104, and/or one or more other applications of one or more other devices.

Figure 3A:
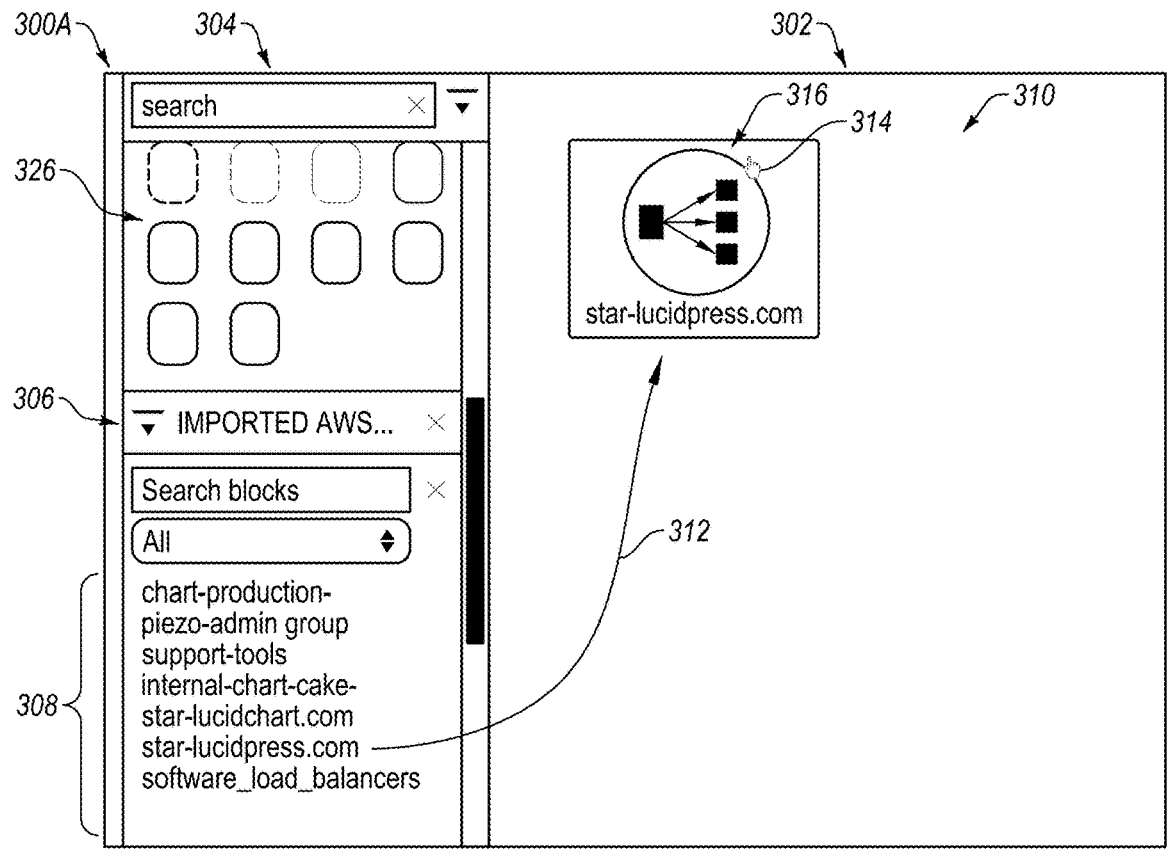
FIGS. 3A-3C include graphical representations of a user interface to generate graphical diagrams.
Figure 3B:
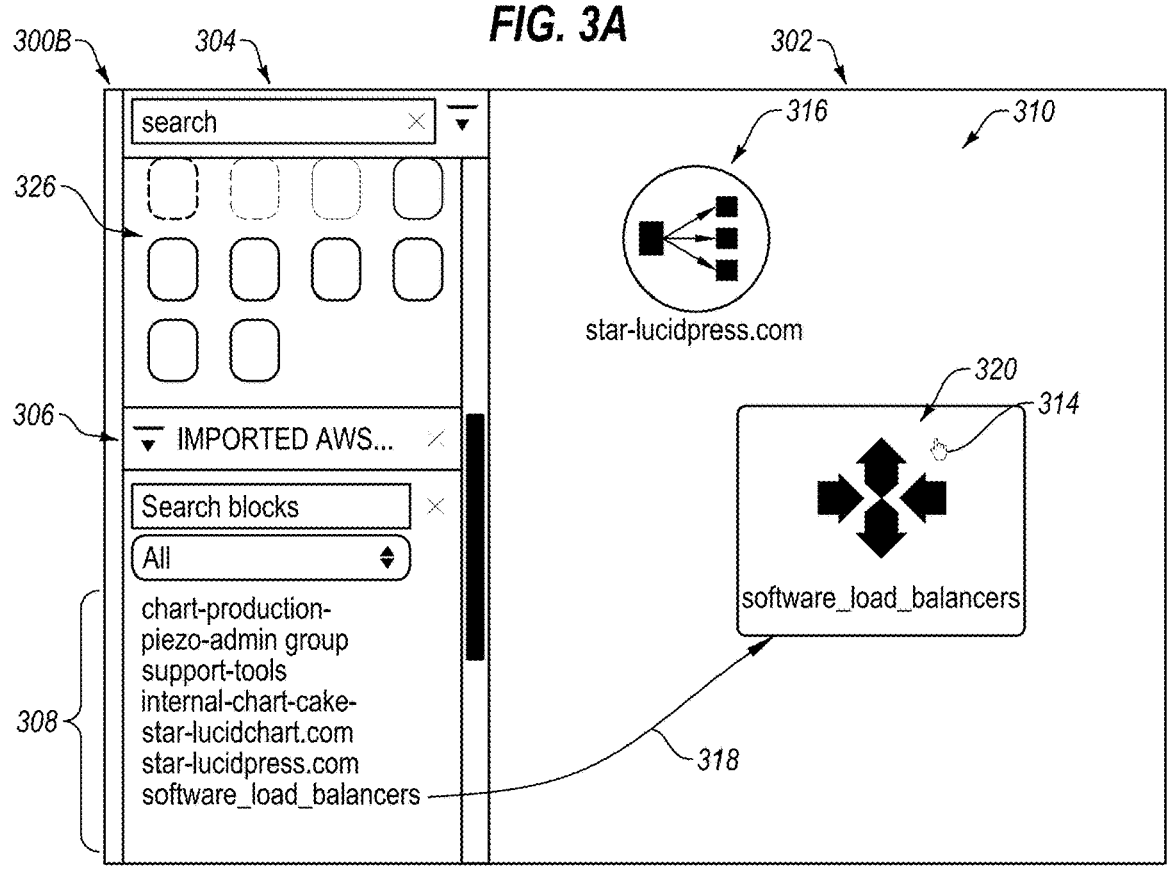
Figure 3C:
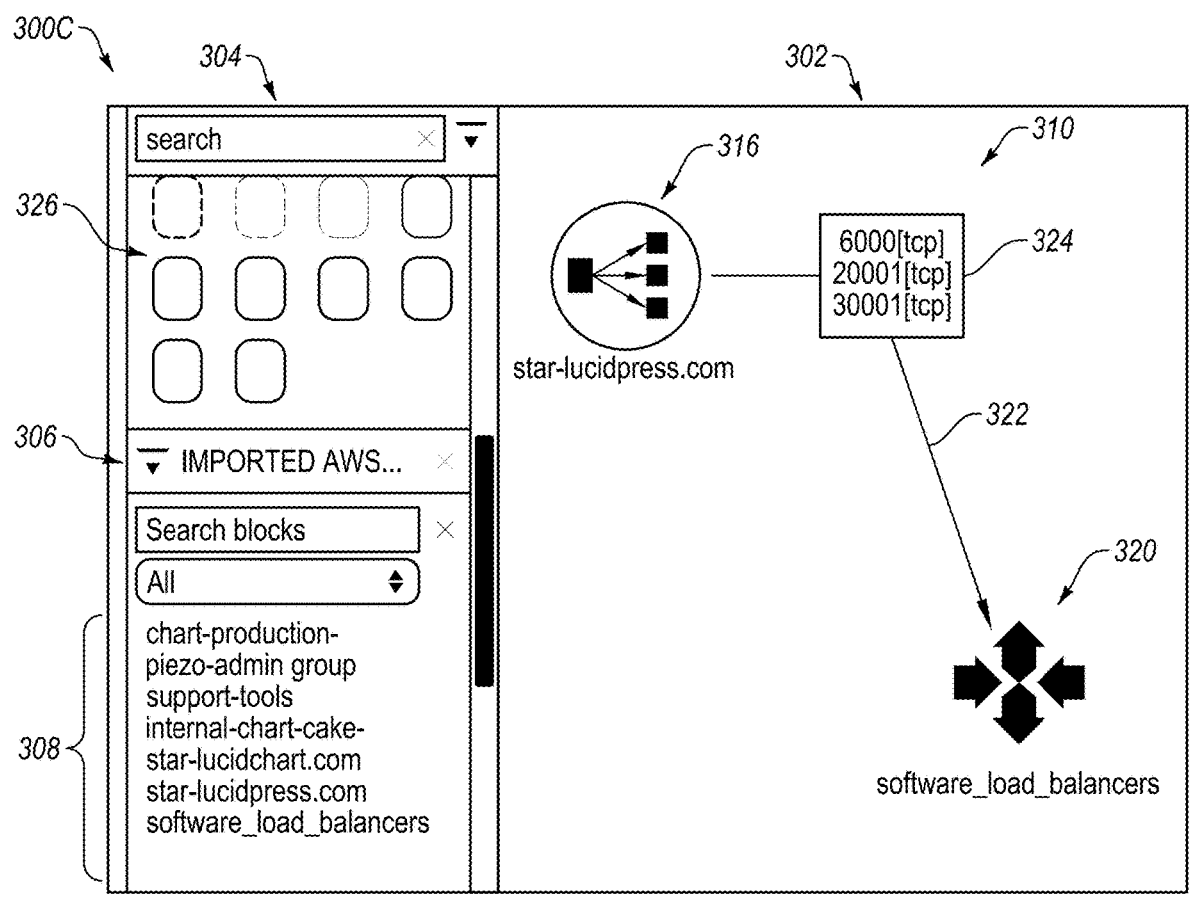

An example implementation of the method 200 of FIG. 2 will be discussed together with FIGS. 3A-3B. FIGS. 3A-3C include graphical representations 300A-300C (collectively "graphical representations 300") of a user interface to generate graphical diagrams, arranged in accordance with at least one embodiment described herein. The user interface may be provided by the browser 128 and/or the diagram application 114 of FIG. 1. For instance, the browser 128 in cooperation with the diagram application 114 may present the user interface to a user through a display of the client device 104. The graphical representations 300 may include point-in-time representations of the user interface corresponding to different steps of the method 200 of FIG. 2.

In FIGS. 3A-3C, the graphical representations 300 include a graphical drawing canvas 302 and a panel 304 beside the graphical drawing canvas 302. The panel 304 may include an input field 306 from which a particular set of structured data may be selected as the source for a graphical diagram. A user may provide input in the input field 306 to browse a directory or otherwise locate and select a desired set of structured data from which the graphical diagram may be generated. In the example of FIGS. 3A-3C, the selected set of structured data is labeled "IMPORTED AWS." Selecting a set of structured data the user has used previously may be effective to import a current version of the structured data from the data source, which may be analyzed to determine if it has been updated compared to a preceding version of the structured data.

The panel 304 includes a list 308 of nodes identified and/or represented in the structured data and/or in a corresponding model derived from the structured data. According to some embodiments described herein, the nodes in the list 308 may be dragged and dropped onto the graphical drawing canvas 302 to generate a graphical diagram 310. Relationships between related nodes may be represented in the graphical diagram 310 by connections which may be automatically displayed without the user having to manually request the connection. The relationships may be automatically determined from the structured data, either directly or from the model derived from the structured data.

With combined reference to FIGS. 2-3C, an example implementation of the method 200 may include, at block 202, displaying the panel 304 beside the graphical drawing canvas 302 with the list 308 of nodes in the panel 304.

The example implementation of the method 200 may additionally include, at block 204, receiving input effective to select a first node labeled "star-lucidpress.com" and a second node labeled "software_load_balancers" from the list 308 to include in the graphical diagram 310. For instance, at block 204A, the user may perform a drag and drop operation on the first node labeled "star-lucidpress.com" as generally denoted at 312 in FIG. 3A by, e.g., moving a mouse cursor 314 to the first node labeled "star-lucidpress.com" in the list 308, clicking and holding a left mouse button, moving the mouse cursor 314 to the graphical drawing canvas 302, and releasing the left mouse button. In some embodiments, a first icon 316 may be displayed in the graphical drawing canvas 302 as the first node labeled "star-lucidpress.com", and the first icon 316 (and/or other icons) may be outlined as shown in FIG. 3A or otherwise highlighted when the mouse cursor 314 is within the graphical drawing canvas 302 to indicate that the first icon 316 is being "held" (e.g., the left mouse button has been clicked and is currently being held) by the mouse. After the left mouse button has been released, the first icon 316 may be depicted as illustrated in FIGS. 3B and 3C without the outline (or other highlighting) illustrated in FIG. 3A While mouse input is being described in this example implementation of the method 200, other types of input can be implemented, as desired.

Alternatively or additionally, at block 204B, the user may perform a drag and drop operation on the second node labeled "software_load_balancers" as generally denoted at 318 in FIG. 3B by, e.g., moving the mouse cursor 314 to the second node labeled "software_load_balancers" in the list 308, clicking and holding the left mouse button, moving the mouse cursor 314 to the graphical drawing canvas 302, and releasing the left mouse button. In some embodiments, a second icon 320 may be displayed in the graphical drawing canvas 302 as the second node labeled "software_load_balancers", and the second icon 320 may be outlined as shown in FIG. 3B or otherwise highlighted when the mouse cursor 314 is within the graphical drawing canvas 302 to indicate that the second icon 320 is being "held" by the mouse. After the left mouse button has been released, the second icon 320 may be depicted as illustrated in FIG. 3C without the outline (or other highlighting) illustrated in FIG. 3B to indicate that the second icon 320 has been released.

The example implementation of the method 200 may additionally include, at block 206, generating and displaying the graphical diagram 310 in the graphical drawing canvas 302, including generating and displaying the first node as the first icon 316, the second node as the second icon 320, and a connection 322 (FIG. 3C) between the first icon 316 and the second icon 320 as a representation that the second node is related to the first node. The connection 322 representing the relationship between the first and second nodes may be automatically displayed in the graphical drawing canvas 302 without the user having to manually request or draw the connection 322 or do anything to get the connection 322 beyond dragging and dropping and dropping the first and second nodes into the graphical drawing canvas 302. In the context of FIG. 3C where the first and second nodes are based on structured data imported from AWS, the connection 322 may indicate that the first and second nodes are related in the sense that they communicate with each other. Alternatively or additionally, the connection 322 may include additional information 324 about the relationship between the first and second nodes, such as ports by which the first and second nodes can connect.

In some embodiments, the panel 304 may additionally include one or more diagram shapes 326. The diagram shapes 326 may be dragged and dropped into the diagram canvas 302 by the user. Alternatively or additionally, the user may create connections between icons representing nodes that are not related. When the diagram shapes 326 are dragged into the diagram canvas 302 with a graphical diagram 310 based on structured data and/or when new connections are created by the user, some embodiments may allow such changes to be pushed back into the structured data as updates. A description of an example implementation of such updates is provided elsewhere herein.

Figure 4:
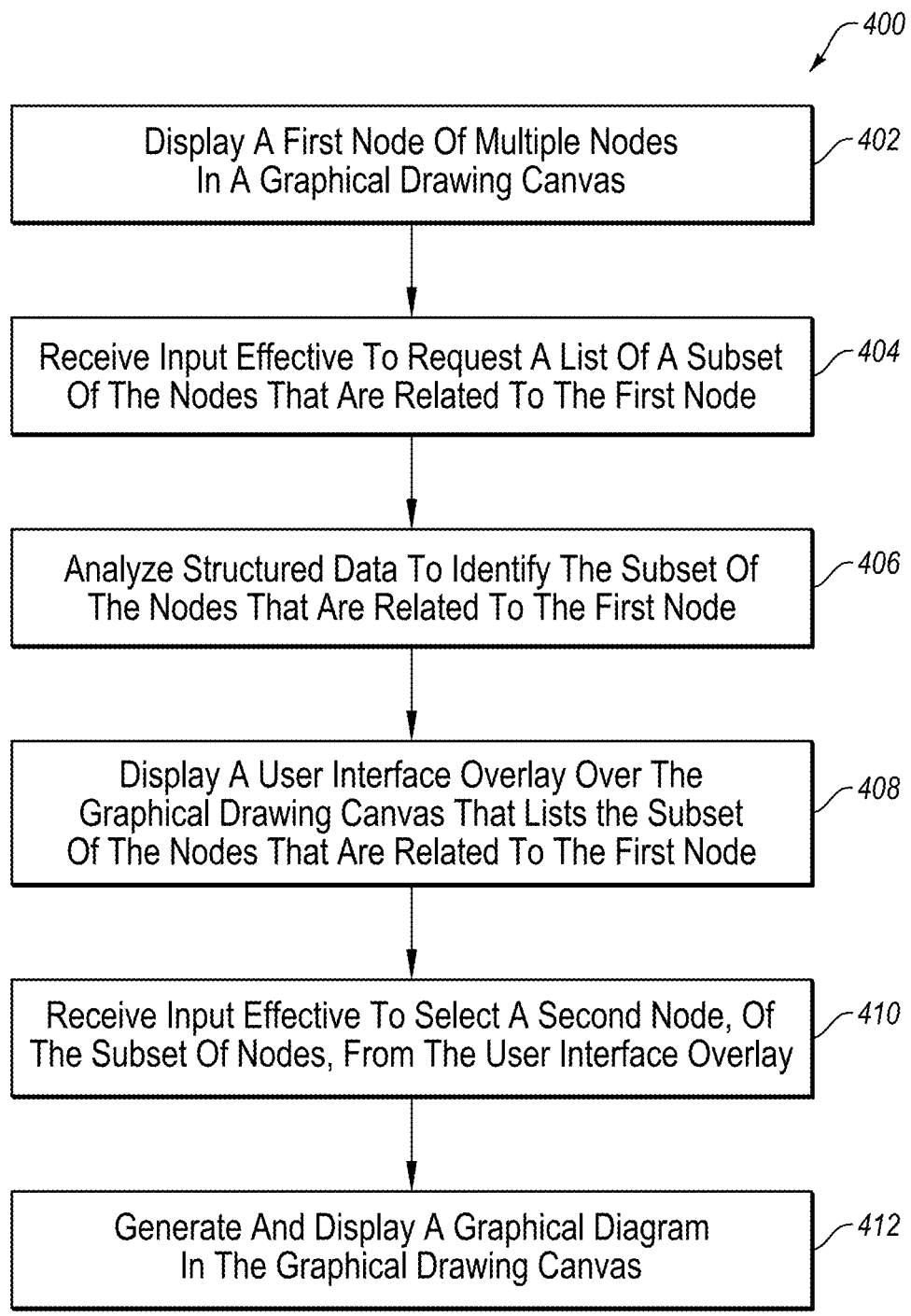
FIG. 4 is a flowchart of another method to generate a graphical diagram based on structured data.

FIG. 4 is a flowchart of another method 400 to generate a graphical diagram based on structured data, arranged in accordance with at least one embodiment described herein. The method 400 may be programmably performed or controlled by a processor in, e.g., a computer and/or server that executes a browser, diagram application, and/or other application to generate graphical diagrams based on structured data. In an example implementation, the method 400 may be performed in whole or in part by the server 102 and/or the client device 104 of FIG. 1. The method 400 may include one or more of blocks 402, 404, 406, 408, 410, and/or 412.

At block 402, the method 400 may include displaying a first node of multiple nodes in a graphical drawing canvas. For instance, the client device 104 of FIG. 1 may display graphical drawing canvas in the browser 128 on a display of the client device with the first node displayed in the graphical drawing canvas, e.g., as a first icon. The first node may be dragged and dropped into the graphical drawing canvas from a panel with a list of the nodes as described with respect to FIGS. 2-3C, for instance. The nodes may be represented by and/or identified in the structured data 120. The client device 104 may import the structured data 120 from the data source 110. Alternatively, the server 102 may import the structured data 120 from the data source 110 and/or may derive the corresponding model 122, where the server 102 may send the client device 104 the list of nodes and/or their relationships based on the structured data 120 and/or the model 122. Block 402 may be followed by block 404.

At block 404, the method 400 may include receiving input effective to request a list of a subset of the nodes that are related to the first node. For instance, the node displayed as the first icon may include one or more expansion points that can be clicked on or otherwise selected to request a list of nodes that are related to the first node. Block 404 may be followed by block 406.

At block 406, the method 400 may include analyzing the structured data to identify the subset of the nodes that are related to the first node. Analyzing the structured data to identify the subset of nodes that are related to the first node may include applying the model rules and/or heuristics 124 to the structured data 120 to derive the model 122 of FIG. 1, which model 122 may identify which particular nodes are related to each given node. Alternatively or additionally, analyzing the structured data to identify the subset of nodes that are related to the first node may include querying the model 122. Block 406 may be followed by block 408.

At block 408, the method 400 may include displaying a user interface overlay over the graphical drawing canvas that lists the subset of the nodes that are related to the first node. The user interface overlay may include, e.g. a window or other user interface element displayed over the graphical drawing canvas that lists the subset of the nodes that are related to the first node. Block 408 may be followed by block 410.

At block 410, the method 400 may include receiving input effective to select a second node, of the subset of nodes, from the user interface overlay. For instance, the user may perform a mouse click or other input on the second node listed in the user interface overlay to select the second node, e.g., for inclusion in a graphical diagram that include both the first node and the second node. Block 410 may be followed by block 412.

At block 412, the method 400 may include generating and displaying the graphical diagram in the graphical drawing canvas, including generating and displaying the first node as a first icon, the second node as a second icon, and a connection between the first icon and the second icon as a representation that the second node is related to the first node.

The method 400 may be combined with one or more other methods and processes described herein, such as the method 200 of FIG. 2.

Figure 5:
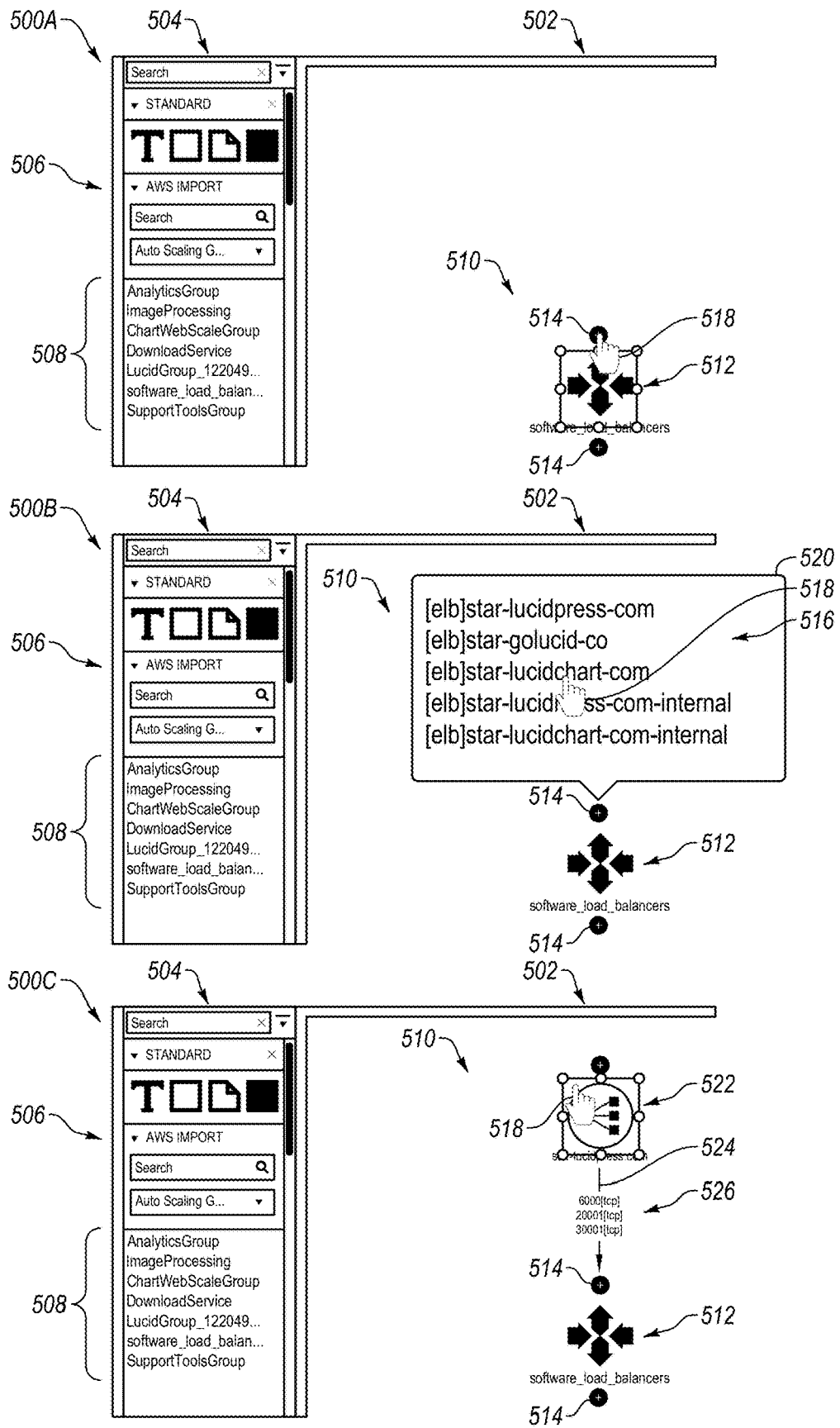
FIG. 5 includes graphical representations of another user interface to generate graphical diagrams

An example implementation of the method 400 of FIG. 4 will be discussed together with FIG. 5. FIG. 5 includes graphical representations 500A-500C (collectively "graphical representations 500") of another user interface to generate graphical diagrams, arranged in accordance with at least one embodiment described herein. The user interface may be provided by the browser 128 and/or the diagram application 114 of FIG. 1. For instance, the browser 128 in cooperation with the diagram application 114 may present the user interface to a user through a display of the client device 104. The graphical representations 500 may include point-in-time representations of the user interface corresponding to different steps of the method 400 of FIG. 4. In some embodiments, the user interface of FIG. 5 may be the same as or similar to the user interface of FIGS. 3A-3C.

In FIG. 5, the graphical representations 500 include a graphical drawing canvas 502 and a panel 504 beside the graphical drawing canvas 502. The panel 504 may include an input field 506 from which a particular set of structured data may be selected as the source for a graphical diagram. A user may provide input in the input field 506 to browse a directory or otherwise locate and select a desired set of structured data from which the graphical diagram may be generated. In the example of FIG. 5, the selected set of structured data is labeled "AWS IMPORT." Selecting a set of structured data the user has used previously may be effective to import a current version of the structured data from the data source, which may be analyzed to determine if it has been updated compared to a preceding version of the structured data.

The panel 504 may include a list 508 of nodes identified and/or represented in the structured data and/or in a corresponding model derived from the structured data. As described with respect to FIGS. 2-3C, the nodes in the list 508 may be dragged and dropped onto the graphical drawing canvas 502 to generate a graphical diagram 510. Relationships between related nodes may be represented in the graphical diagram 510 by connections which may be automatically displayed without the user having to manually request display of the connection. The relationships may be automatically determined from the structured data, either directly or from the model derived from the structured data.

In the example of FIG. 5, a first node labeled "software_load_balancers" in the list 508 is already depicted as a first icon 512 in each of the graphical representations 500. The first node displayed as the first icon 512 may have been dragged and dropped into the graphical drawing canvas 502 generally in the manner described with respect to FIGS. 2-3C. The first node displayed as the first icon 512 may include one or more expansion points 514. Each node displayed as an icon in the graphical drawing canvas 502 may similarly include one or more expansion points 514.

With combined reference to FIGS. 4-5, an example implementation of the method 400 may include, at block 402, displaying the first node labeled "software_load_balancers" as the first icon 512 in the graphical drawing canvas 502.

The example implementation of the method 400 may additionally include, at block 404, receiving input effective to request a list 516 of a subset of the nodes that are related to the first node. Receiving the input effective to request the list 516 of the subset of the nodes that are related to the first node may include receiving input (e.g., a mouse click) effective to select one of the expansion points 514 of the first node. For instance, the user may move a mouse cursor 518 to one of the expansion points 514 and click on or otherwise select the expansion point 514. Where a given node has multiple expansion points 514, the particular expansion 514 point that is selected may be the same expansion point 514 to which a connection is drawn between the given node and a node selected from the corresponding list.

The example implementation of the method 400 may additionally include, at block 406, analyzing the structured data to identify the subset of the nodes that are related to the first node.

The example implementation of the method 400 may additionally include, at block 408, displaying a user interface overlay 520 over the graphical drawing canvas 502 that includes the list 516 with the subset of the nodes that are related to the first node.

The example implementation of the method 400 may additionally include, at block 410, receiving input effective to select a second node labeled "[elb]star-lucidchart-com", of the subset of the nodes that are related to the first node, from the user interface overlay 520. For instance, the user may move the mouse curse 518 to the second node labeled "[elb] star-lucidchart-com" in the list 516 of the user interface overlay 520 and click on or otherwise select the second node labeled "[elb]star-lucidchart-com". While mouse input is being described in this example implementation of the method 400, other types of input can be implemented, as desired.

The example implementation of the method 400 may additionally include, at block 412, generating and displaying the graphical diagram 510 in the graphical diagram canvas 502, including generating and displaying the first node as the first icon 512, the second node as a second icon 522 (graphical representation 500C), and a connection 524 (graphical representation 500C) between the first icon 512 and the second icon 522 as a representation that the second node is related to the first node. The connection 524 representing the relationship between the first and second nodes may be automatically displayed in the graphical drawing canvas 502 without the user having to manually request or draw the connection 524 or do anything to get the connection 524 beyond generally selecting the second node from the user interface overlay 520. In the context of FIG. 5 where the first and second nodes are based on structured data imported from AWS, the connection 524 may indicate that the first and second nodes are related in the sense that they communicate with each other. Alternatively or additionally, the connection 524 may include additional information 526 about the relationship between the first and second nodes, such as ports by which the first and second nodes can connect.

Figure 6:
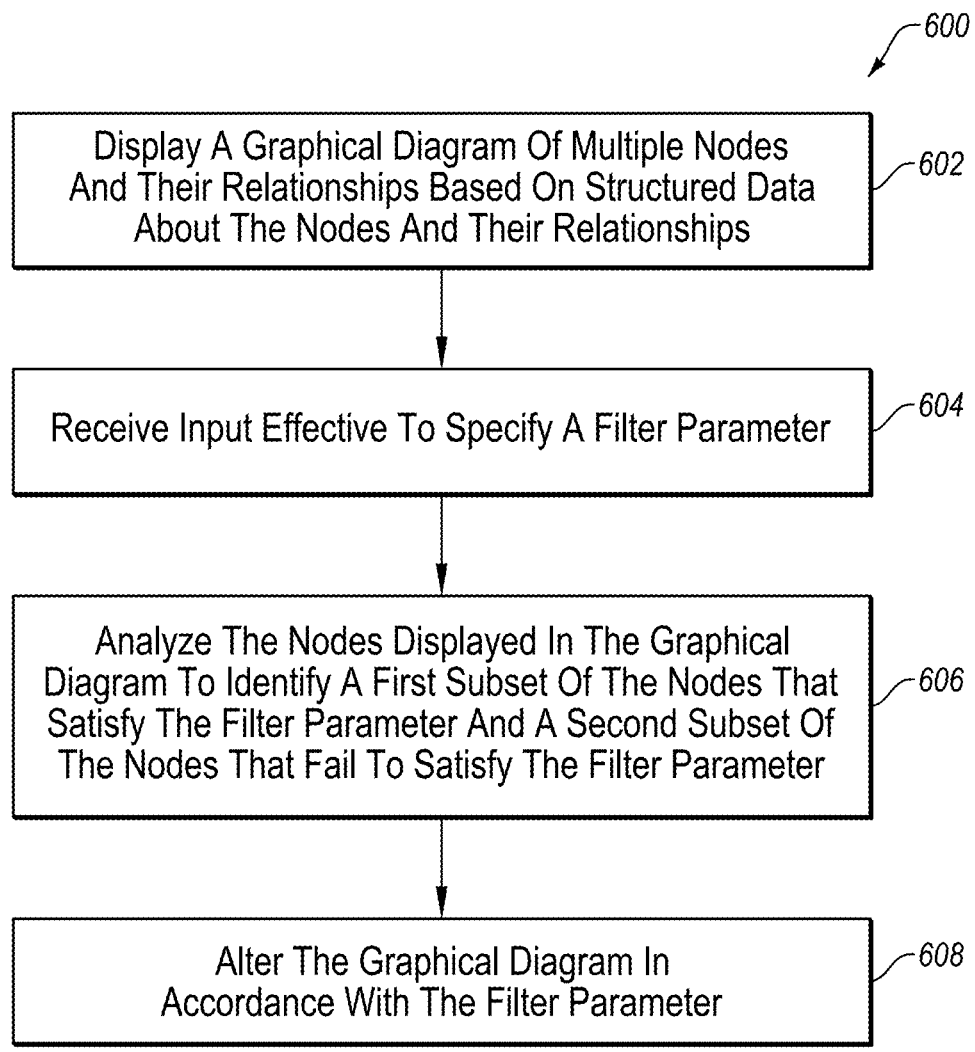
FIG. 6 is a flowchart of a method to filter a graphical diagram based on structured data.

FIG. 6 is a flowchart of a method 600 to filter a graphical diagram based on structured data, arranged in accordance with at least one embodiment described herein. The method 600 may be programmably performed or controlled by a processor in, e.g., a computer and/or server that executes a browser, diagram application, and/or other application to generate graphical diagrams based on structured data. In an example implementation, the method 600 may be performed in whole or in part by the server 102 and/or the client device 104 of FIG. 1. The method 600 may include one or more of blocks 602, 604, 606, and/or 608.

At block 602, the method 600 may include displaying a graphical diagram of multiple nodes and their relationships based on structured data about the nodes and their relationships. The graphical diagram may be generated as described with respect to one or both of the methods 200 and 400 of FIGS. 2 and 4 and/or in some other manner. Thus, each of the nodes may be displayed in a graphical drawing canvas as a corresponding icon, where relationships between nodes may be represented by connections between the icons. Block 602 may be followed by block 604.

At block 604, the method 600 may include receiving input effective to specify a filter parameter. For instance, a user interface in which the graphical diagram is displayed may include a search field into which a user may enter a keyword, a date or date range, a cost, or other filter parameter. Thus, receiving input effective to specify a filter parameter may include receiving the keyword, date or date range, cost, or other filter parameter entered by the user in the search field of the user interface. Block 604 may be followed by block 606.

At block 606, the method 600 may include analyzing the nodes displayed in the graphical diagram to identify a first subset of the nodes that satisfy the filter parameter and a second subset of the nodes that fail to satisfy the filter parameter. Analyzing the nodes may include analyzing tags of the nodes, where the tags are included in the structured data and the first subset of the nodes that satisfy the filter parameter may include nodes with tags that satisfy the filter parameter. For a keyword filter parameter, analyzing the nodes may include searching tags or other fields of the nodes in the graphical diagram, in the structured data, and/or in a corresponding model for the keyword. Any node that has a tag or other field with the keyword, e.g., in the graphical diagram, in the structured data, and/or in the corresponding model, may be identified as being in the first subset that satisfy the filter parameter, while those that don't may be identified as being in the second subset that do not satisfy the filter parameter. Analogous analysis may be performed for other types of filter parameters. Block 606 may be followed by block 608.

At block 608, the method 600 may include altering the graphical diagram in accordance with the filter parameter. Altering the graphical diagram in accordance with the filter parameter may include emphasizing the first subset of the nodes that satisfy the filter parameter relative to the second subset of the nodes that fail to satisfy the filter parameter, such as by highlighting the first subset of nodes in the graphical diagram that satisfy the filter parameter. Alternatively or additionally, altering the graphical diagram in accordance with the filter parameter may include deemphasizing the second subset of the nodes that fail to satisfy the filter parameter relative to the first subset of the nodes that satisfy the filter parameter, such as by greying out the second subset of the nodes in the graphical diagram that fail to satisfy the filter parameter. Alternatively or additionally, altering the graphical diagram in accordance with the filter parameter may further include rearranging the nodes so the first subset of the nodes that satisfy the filter parameter are consolidated together.

Instead of or in addition to altering the graphical diagram in accordance with the filter parameter at block 608, at least one embodiment described herein may output a list (e.g., a textual list) of matching nodes (e.g., a list of nodes that satisfy the filter parameter). The list may be separate from the representation of the nodes in the graphical diagram. For instance, the list of matching nodes may be presented in a user interface overlay over the graphical drawing canvas, in a panel next to or near the graphical drawing canvas, in a separate window, or in some other manner.

The method 600 may be combined with one or more other methods and processes described herein, such as one or more of the methods 200 and 400 of FIGS. 2 and 4.

Figure 7A:
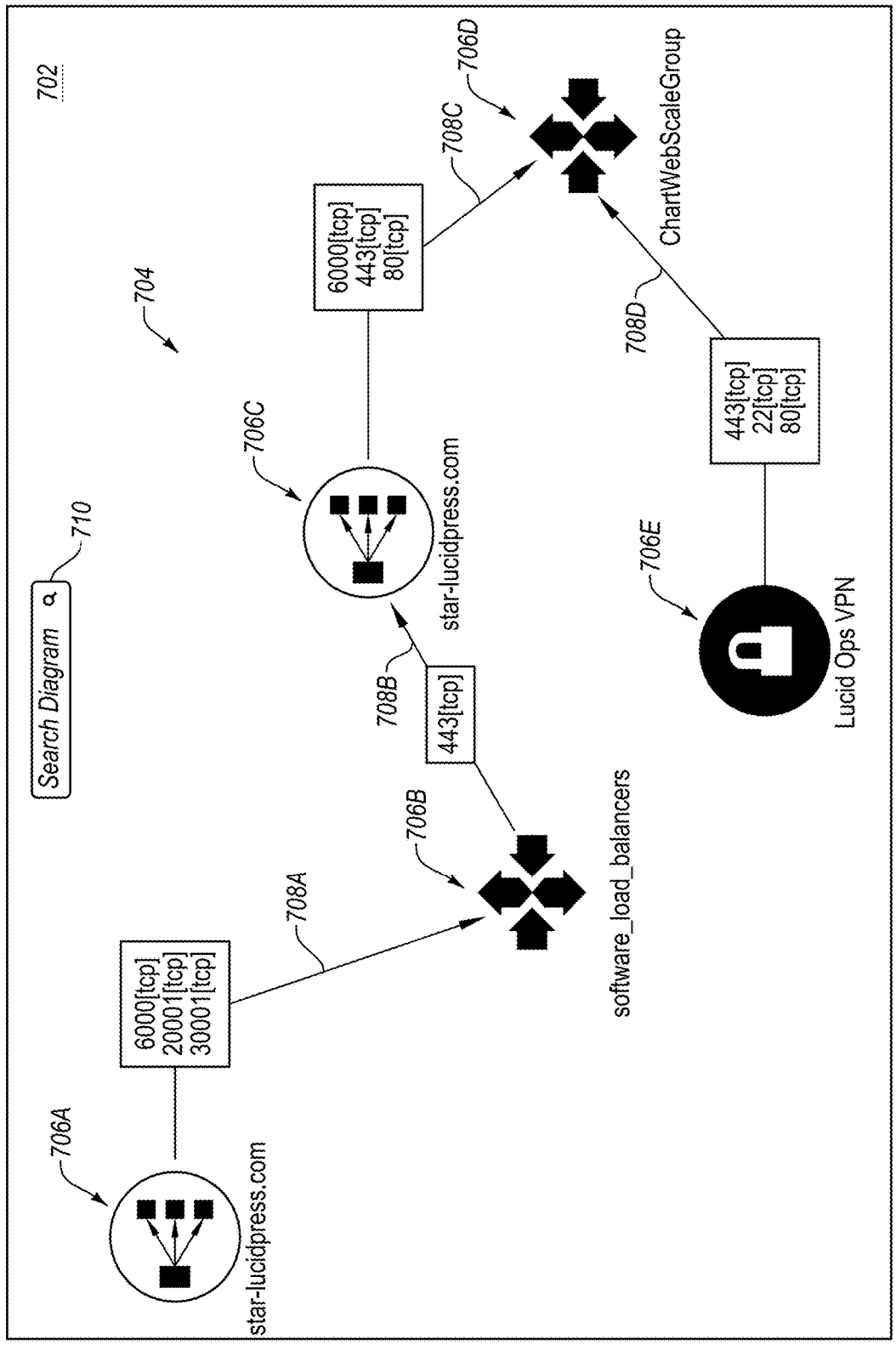
FIGS. 7A-7C include graphical representations of a user interface to filter graphical diagrams.
Figure 7B:
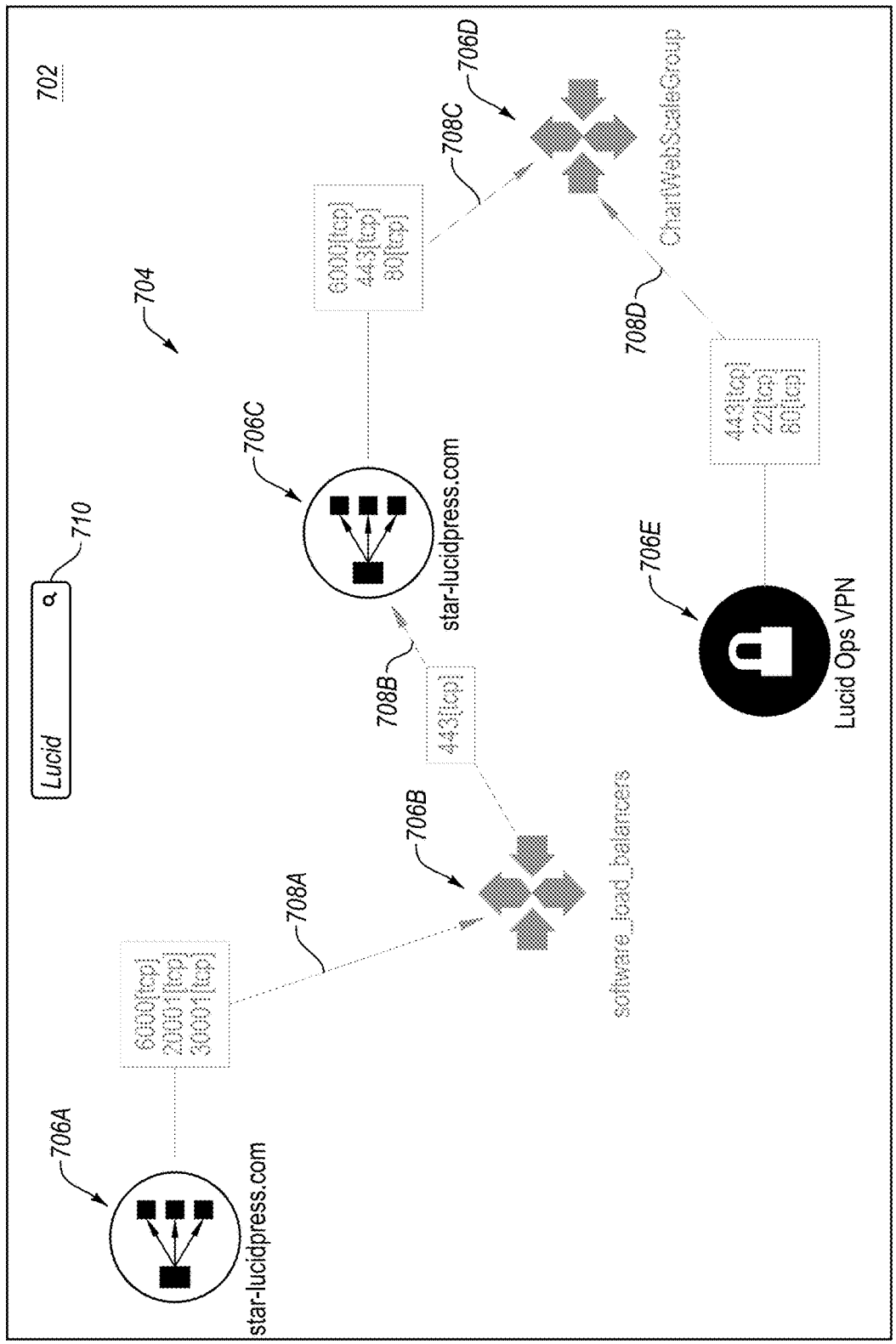
Figure 7C:
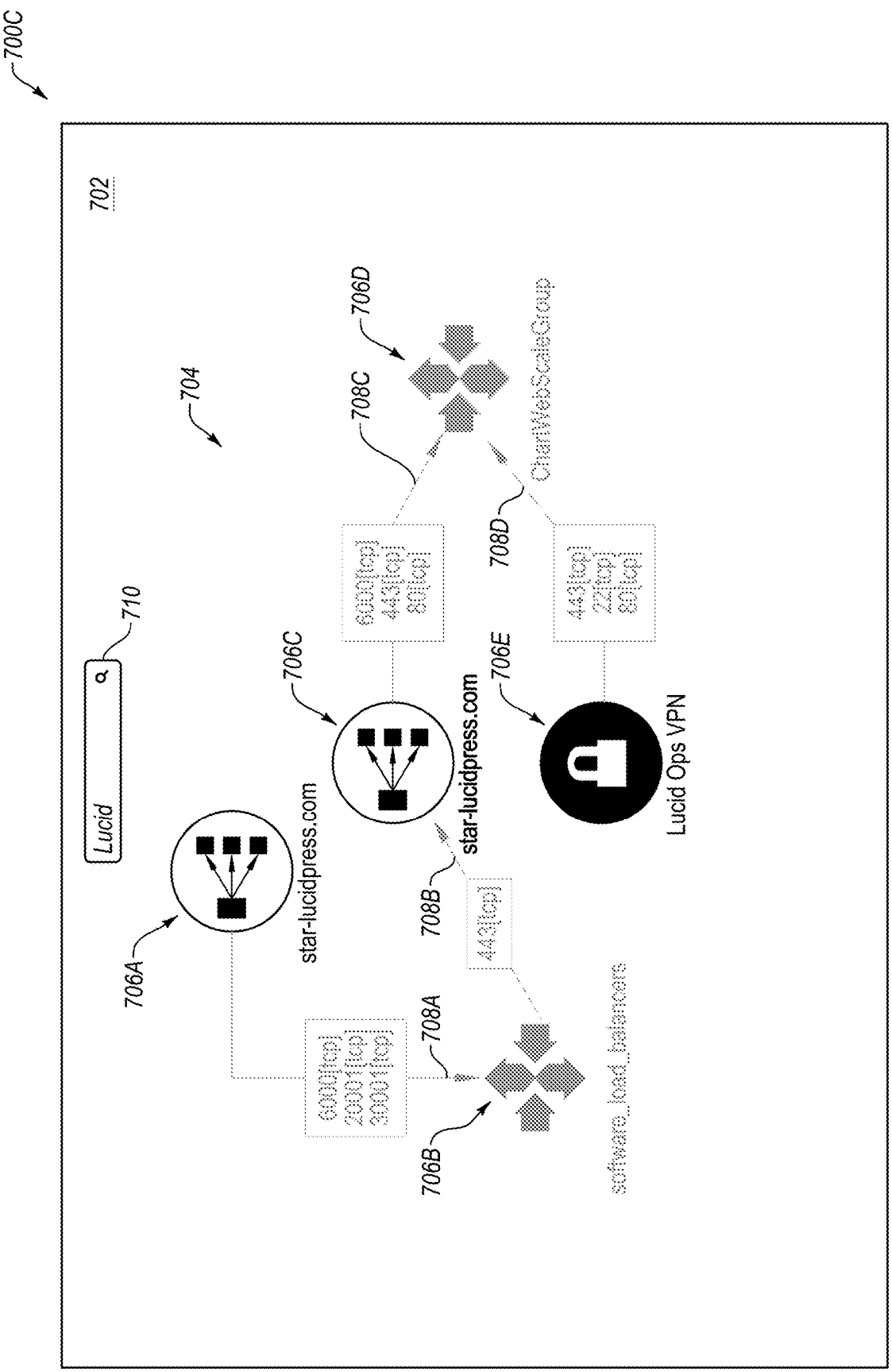

An example implementation of the method 600 of FIG. 6 will be discussed together with FIGS. 7A-7C. FIGS. 7A-7C include graphical representations 700A-700C (collectively "graphical representations 700") of a user interface to filter graphical diagrams, arranged in accordance with at least one embodiment described herein. The user interface may be provided by the browser 128 and/or the diagram application 114 of FIG. 1. For instance, the browser 128 in cooperation with the diagram application 114 may present the user interface to a user through a display of the client device 104. The graphical representations 700 may include point-in-time representations of the user interface corresponding to different steps of the method 600 of FIG. 6. In some embodiments, the user interface of FIGS. 7A-7C may be the same as or similar to the user interfaces of FIGS. 3A-3C and 5.

In FIGS. 7A-7C, the graphical representations 700 include a graphical drawing canvas 702 within which a graphical diagram 704 is displayed. The graphical diagram 704 may be generated as described with respect to one or both of the methods 200 and 400 of FIGS. 2 and 4 and/or in some other manner.

The graphical diagram 704 as illustrated in FIGS. 7A-7C includes a first node 706A, a second node 706B, a third node 706C, a fourth node 706D, and a fifth node 706E (collectively "nodes 706"). Each of the nodes 706 is displayed in the graphical drawing canvas 702 as a corresponding icon.

The graphical diagram 704 additionally includes various connections between the nodes 706, including a first connection 708A, a second connection 708B, a third connection 708C, and a fourth connection 708D (collectively "connections 708"). The connections 708 represent relationships between the nodes 706, such as an indication that the corresponding nodes can communicate with each other. The first connection 708A may represent that the first and second nodes 706A, 706B are related (e.g., can communicate with each other), the second connection 708B may represent that the second and third nodes 706B, 706C are related, the third connection 708C may represent that the third and fourth nodes 706C, 706D are related, and the fourth connection 708D may represent that the fourth and fifth nodes 706D, 706E are related. As illustrated in FIGS. 7A-7C, each of the connections 708 may include additional information, such as ports over which the corresponding nodes 706 may communicate with each other.

The graphical drawing canvas 702 of FIGS. 7A-7C and/or another portion of the user interface may further include a search field 710. The user may enter one or more filter parameters in the search field 710 to filter the graphical diagram 704 according to the one or more filter parameters.

Referring to FIGS. 6 and 7A, the example implementation of the method 600 may include, at block 602, displaying the graphical diagram 704 of the nodes 706 and their relationships (represented by connections 708) based on structured data about the nodes 706 and their relationships. The graphical diagram 704 prior to any filtering is illustrated in FIG. 7A.

The example implementation of the method 600 may additionally include, at block 604, receiving input effective to specify a filter parameter by, e.g., receiving a keyword "Lucid" as the filter parameter, which may be entered by the user through the search field 710 as illustrated in FIG. 7B.

The example implementation of the method 600 may additionally include, at block 606, analyzing the nodes 706 displayed in the graphical diagram 704 to identify a first subset of the nodes 706 that satisfy the filter parameter and a second subset of the nodes that fail to satisfy the filter parameter. In the example of FIGS. 7A-7C, each of the nodes 706 has a tag with a name of the node 706, e.g., "star-lucidpress.com" for the first node 706A and the third node 706C, "software_load_balancers" for the second node 706B, "ChartWebScaleGroup" for the fourth node 706D, and "Lucid Ops VPN" for the fifth node 706E. Thus, analyzing the nodes 706 to identify the first and second subsets may include analyzing the tags of the nodes to identify the first, third, and fifth nodes 706A, 706C, 706E as satisfying the filter parameter since each includes the keyword "Lucid" in its tag and to identify the second and fourth nodes 706B, 706D as failing to satisfy the filter parameter since neither includes the keyword "Lucid" in its tag.

The example implementation of the method 600 may additionally include, at block 608, altering the graphical diagram 704 in accordance with the filter parameter. For instance, in FIG. 7B, the graphical diagram 704 has been altered compared to FIG. 7A by greying out the second and fourth nodes 706B, 706D that fail to satisfy the filter parameter. In some embodiments, connections to each node that fails to satisfy the filter parameter, such as all of the connections 708 in the example of FIG. 7B, may be greyed out or otherwise altered consistent with the alteration of the nodes that fail to satisfy the filter parameter. More generally, altering the graphical diagram 704 in accordance with the filter parameter may include emphasizing the nodes 706 that satisfy the filter parameter and/or de-emphasizing the nodes 706 that fail to satisfy the filter parameter.

Alternatively or additionally, and as illustrated in FIG. 7C, altering the graphical diagram 704 in accordance with the filter parameter may further include rearranging the nodes 706 so the first, third, and fifth nodes 706A, 706C, 706E that satisfy the filter parameter are consolidated together. Although not illustrated in FIGS. 7A-7C, in some embodiments the graphical diagram canvas 702 or another portion of the user interface of FIGS. 7A-7C may include one or more buttons to toggle between consolidating or not the first, third, and fifth nodes 706A, 706C, 706E that satisfy the filter parameter.

Figure 8:
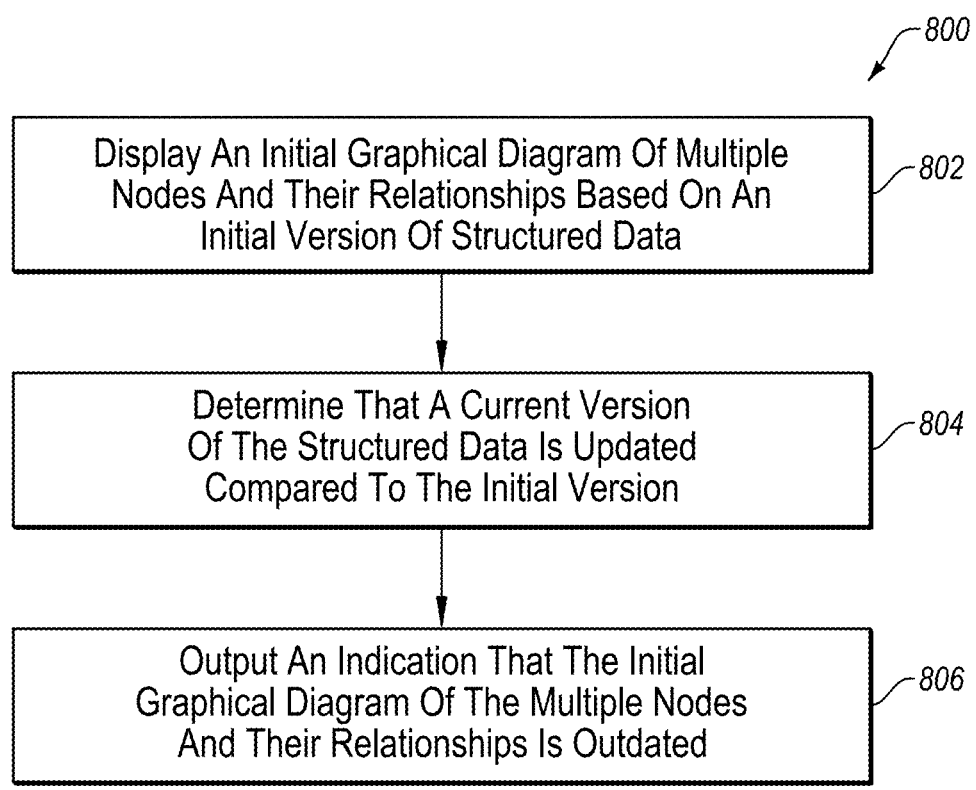
FIG. 8 is a flowchart of a method to update a graphical diagram.

FIG. 8 is a flowchart of a method 800 to update a graphical diagram, arranged in accordance with at least one embodiment described herein. The method 800 may be programmably performed or controlled by a processor in, e.g., a computer and/or server that executes a browser, diagram application, and/or other application to generate graphical diagrams based on structured data. In an example implementation, the method 800 may be performed in whole or in part by the server 102 and/or the client device 104 of FIG. 1. The method 800 may include one or more of blocks 802, 804, and/or 806.

At block 802, the method 800 may include displaying an initial graphical diagram of multiple nodes and their relationships based on an initial version of structured data about the nodes and their relationships. The initial graphical diagram may be generated as described with respect to one or both of the methods 200 and 400 of FIGS. 2 and 4 and/or in some other manner. Thus, each of the nodes may be displayed in a graphical drawing canvas as a corresponding icon, where relationships between nodes may be represented by connections between the icons. Block 802 may be followed by block 804.

At block 804, the method 800 may include determining that a current version of the structured data is updated compared to the initial version of the structured data with respect to at least one of the nodes or the relationships. In some embodiments, the initial graphical diagram may be timestamped to indicate a date and/or time at which it was generated and/or may identify a version (e.g., by timestamp or other indicator) of the structured data from which the initial graphical diagram was generated. A current version of the structured data may have a timestamp or other indicator to indicate a date and/or time at which it was imported from the corresponding data source. The timestamps or other indicators may be compared to determine whether the initial graphical diagram was generated based on the current version of the structured data. If not, the current version of the structured data and/or a model derived therefrom may be compared to the initial version of the structured data and/or a model derived therefrom to identify one or more changes from the initial version to the current version. Alternatively or additionally, the initial graphical diagram may be compared to the current version of the structured data and/or the model derived therefrom to identify one or more changes to nodes and/or relationships included in the initial graphical diagram. Block 804 may be followed by block 806.

At block 806, and in response to determining that the current version of the structured data is updated compared to the initial version of the structured data, the method 800 may include outputting an indication that the initial graphical diagram of the nodes and their relationships is outdated. For instance, outputting the indication may include outputting a text output describing the existence of and/or listing one or more discrepancies and/or a number of discrepancies between the nodes or relationships displayed in the initial graphical diagram and the current version of the structured data. Alternatively or additionally, outputting the indication may include highlighting at least one of the nodes or the relationships displayed in the initial graphical diagram that, relative to the initial version of the structured data, is modified or deleted in the current version of the structured data.

The method 800 may further include, e.g., prior to determining that the current version of the structured data is updated compared to the initial version of the structured data, receiving input effective to request that the initial graphical diagram be checked for updates against the structured data, wherein the determining occurs in response to receiving the input. For instance, the graphical diagram may be displayed on a graphical diagram canvas of a user interface that includes a button that can be selected to check for updates.

In some embodiments, and responsive to determining that the current version of the structured data is updated compared to the initial version of the structured data, the method 800 may further include generating a current graphical diagram of the nodes and their relationships based on the current version of the structured data, where the current graphical diagram includes at least one difference compared to the initial graphical diagram. The current graphical diagram may be generated automatically and without input from the user. A first user interface button may be output on a display that is effective, in response to selection thereof, to display the initial graphical diagram. A second user interface button may also be output on the display that is effective, in response to selection thereof, to display the current graphical diagram. Accordingly, user input may be received that is effective to select one of the first or second user interface buttons. In response to receiving input effective to select the first user interface button, the initial graphical diagram may be displayed and the current graphical diagram may be obscured. On the other hand, and in response to receiving user input effective to select the second user interface button, the current graphical diagram may be displayed and the initial graphical diagram may be obscured.

In this and other embodiments, displaying the current graphical diagram that includes the at least one difference may include displaying an updated node or relationship that is updated in the current version of the structured data compared to the initial version of the structured data. Alternatively or additionally, displaying the current graphical diagram that includes the at least one difference may include displaying a new node or relationship from the current version of the structured data that is absent from the initial version of the structured data. Alternatively or additionally, displaying the current graphical diagram that includes the at least one difference may include omitting a deleted node or relationship that is deleted from the current version of the structured data compared to the initial version of the structured data.

In some embodiments, the method 800 may further include outputting on the display a diagram update user interface button that is effective, in response to selection thereof, to update the initial graphical diagram consistent with the current version of the structured data. The method 800 may additionally include receiving input effective to select the diagram update user interface button. In response thereto, the method 800 may additionally include updating the initial graphical diagram consistent with the current version of the structured data, including modifying the initial graphical diagram to match the current graphical diagram.

In some embodiments, the graphical diagram may be updated by the user by the user adding one or more nodes, modifying one or more existing nodes, adding one or more connections between nodes to indicate a relationship therebetween, and/or modifying one or more existing relationships. Alternatively or additionally, the user may desire that the current version of the structured data revert to the initial version of the structured data. Accordingly, the current version of the structured data may be updated based on the initial graphical diagram, which may reflect the initial version of the structured data and/or may include one or more updates by the user. For instance, the method 800 may further include outputting on the display a source data update user interface button effective to update the current version of the structured data consistent with the initial graphical diagram. The method 800 may additionally include receiving input effective to select the source data update user interface button. In response thereto, the method 800 may further include updating the current version of the structured data consistent with the initial graphical diagram, including modifying the current version of the structured data at its source to match the initial version of the structured data at least with respect to each of the nodes and relationships in the initial graphical diagram.

The method 800 may be combined with one or more other methods and processes described herein, such as one or more of the methods 200, 400, and 600 of FIGS. 2, 4, and 6.

An example implementation of the method 800 of FIG. 8 will be discussed together with FIGS. 9A-9D. FIGS. 9A-9D include graphical representations 900A-900D (collectively "graphical representations 900") of a user interface to update graphical diagrams, arranged in accordance with at least one embodiment described herein. The user interface may be provided by the browser 128 and/or the diagram application 114 of FIG. 1. For instance, the browser 128 in cooperation with the diagram application 114 may present the user interface to a user through a display of the client device 104. The graphical representations 900 may include point-in-time representations of the user interface corresponding to different steps of the method 800 of FIG. 8. In some embodiments, the user interface of FIGS. 9A-9D may be the same as or similar to the user interfaces of FIGS. 3A-3C, 5, and 7A-7C.

In FIGS. 9A-9D, the graphical representations 900 include a graphical drawing canvas 902 within which an initial graphical diagram 904A or an updated graphical diagram 904B is displayed (collectively "graphical diagrams 904"). The initial graphical diagram 904A may be generated as described with respect to one or both of the methods 200 and 400 of FIGS. 2 and 4 and/or in some other manner. The current graphical diagram 904B may be generated automatically based on a current version of structured data that is updated compared to an initial version of structured data on which the initial graphical diagram 904A is based.

The graphical diagrams 904 as illustrated in FIGS. 9A-9D include a first node 906A, a second node 906B, a third node 906C, a fourth node 906D, and a fifth node 906E (collectively "nodes 906"). Each of the nodes 906 is displayed in the graphical drawing canvas 902 as a corresponding icon.

The graphical diagram 904 additionally includes various connections between the nodes 906, including a first connection 908A, a second connection 908B, a third connection 908C, and a fourth connection 908D (collectively "connections 908"). The connections 908 represent relationships between the nodes 906, such as an indication that the corresponding nodes can communicate with each other. The first connection 908A may represent that the first and second nodes 906A, 906B are related (e.g., can communicate with each other), the second connection 908B may represent that the second and third nodes 906B, 906C are related, the third connection 908C may represent that the third and fourth nodes 906C, 906D are related, and the fourth connection 908D may represent that the fourth and fifth nodes 906D, 906E are related. As illustrated in FIGS. 9A-9D, each of the connections 908 may include additional information, such as ports over which the corresponding nodes 906 may communicate with each other. The connections 908 may alternatively be referred to as relationships 908.

Figure 9A:
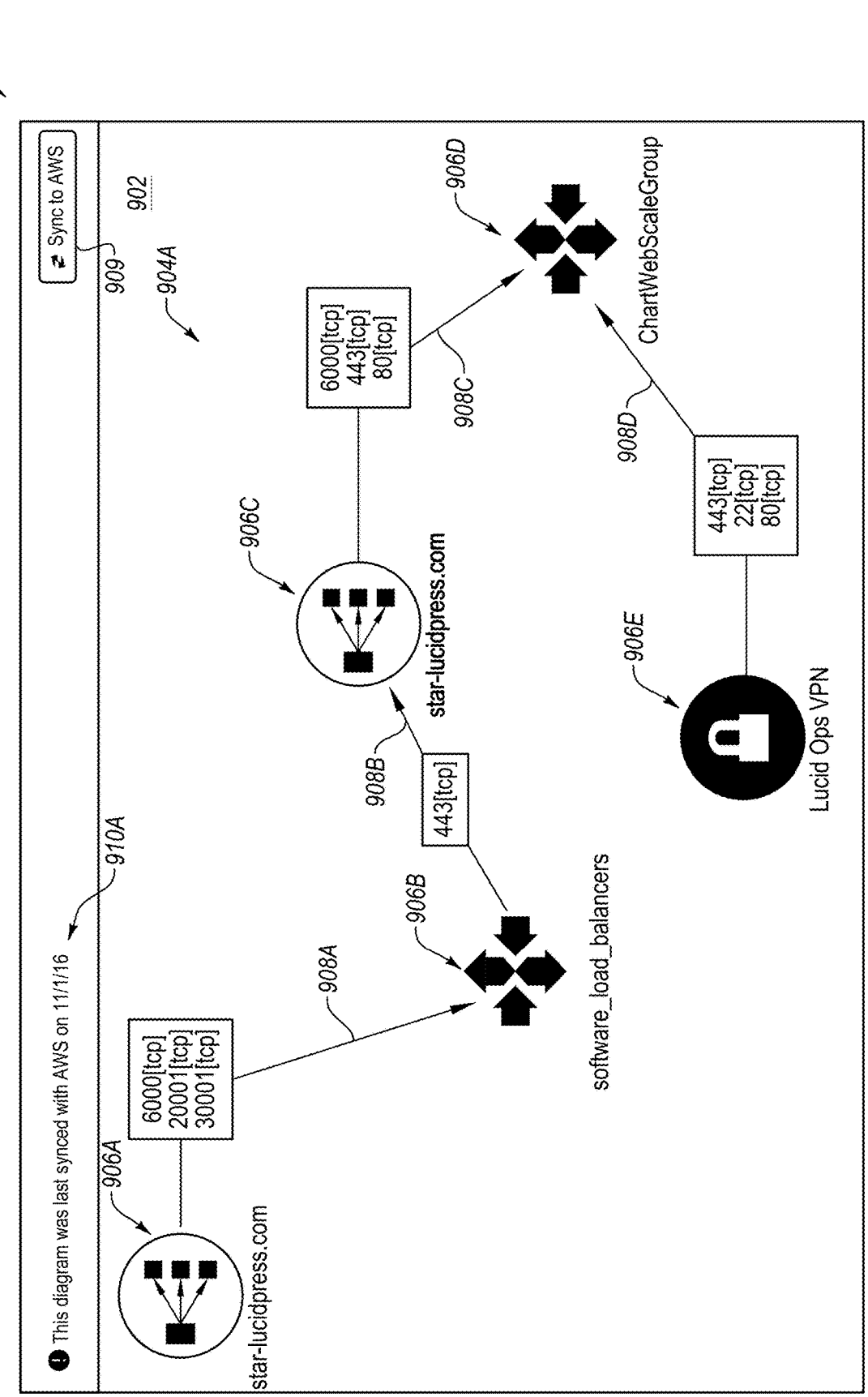
FIGS. 9A-9D include graphical representations of a user interface to update graphical diagrams, all arranged in accordance with at least one embodiment described herein.
Figure 9B:
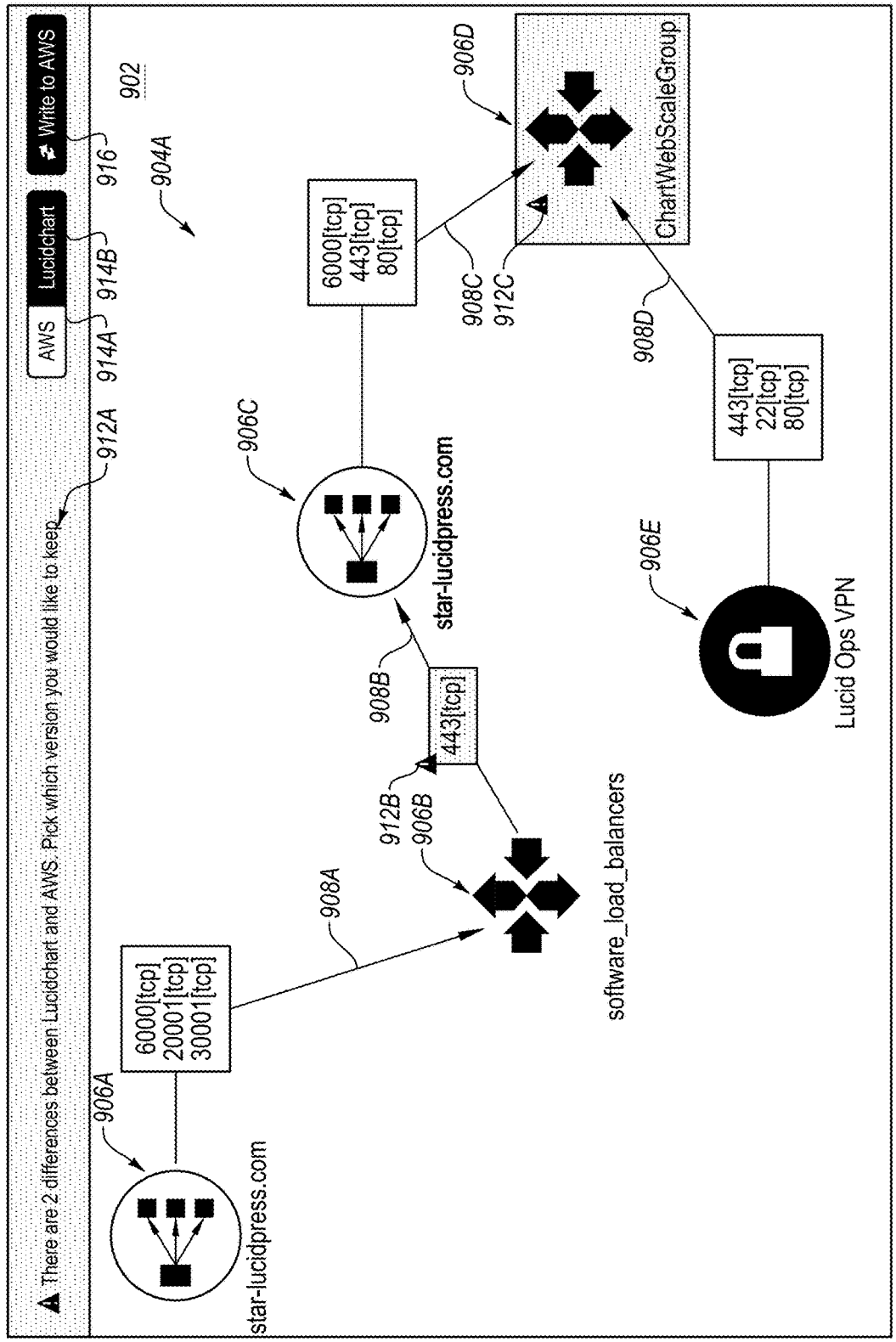
Figure 9C:
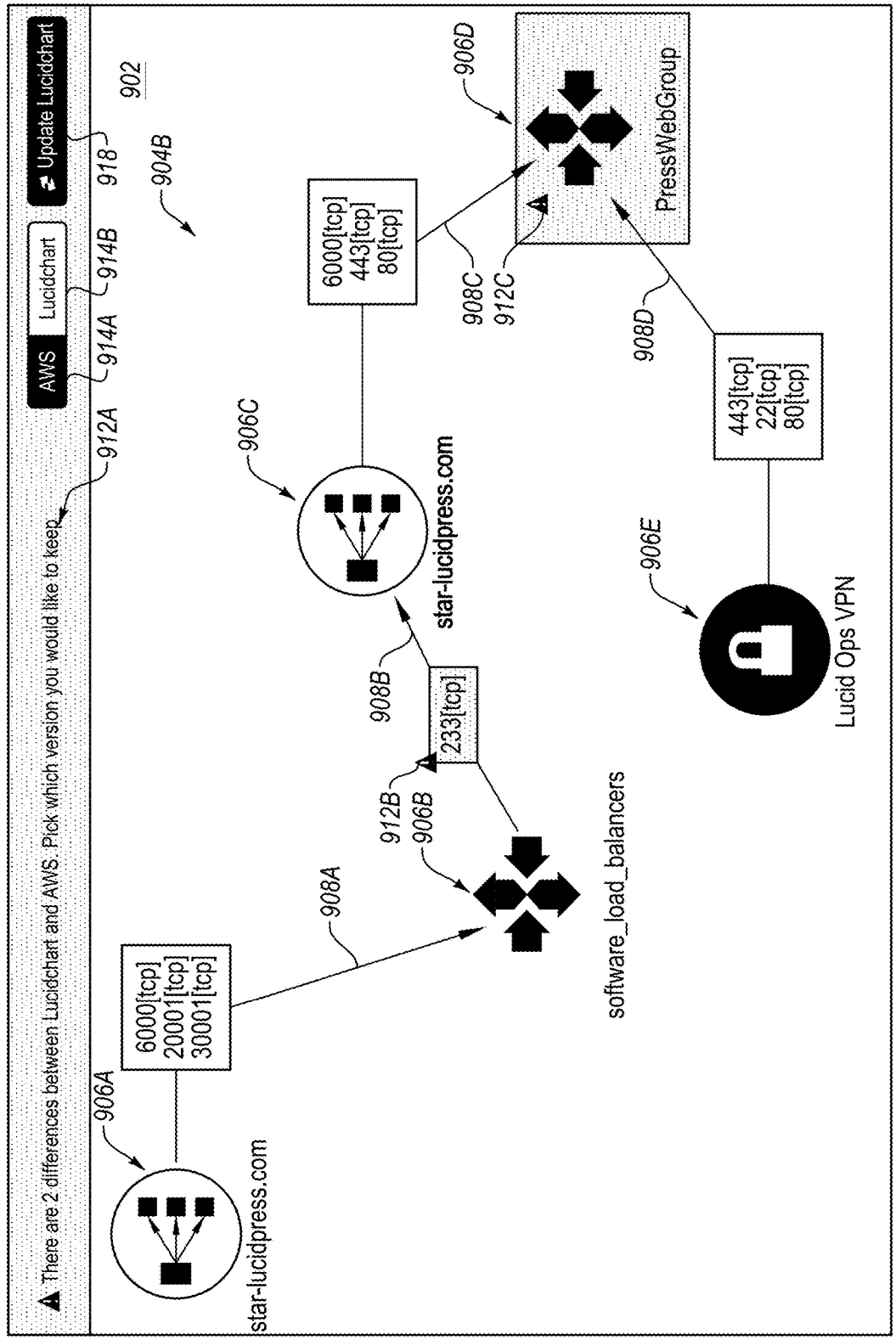

The graphical drawing canvas 902 of FIGS. 9A-9D and/or another portion of the user interface may further include one or more of a timestamp 910A (FIG. 9A) or 910B (FIG. 9D) (collectively "timestamps 910"), a sync button 909 (FIGS. 9A and 9D), discrepancy alerts 912A-912C (FIGS. 9B and 9C), and buttons 914A (FIGS. 9B and 9C), 914B (FIGS. 9B and 9C), 916 (FIG. 9B), and 918 (FIG. 9C).

Figure 9D:
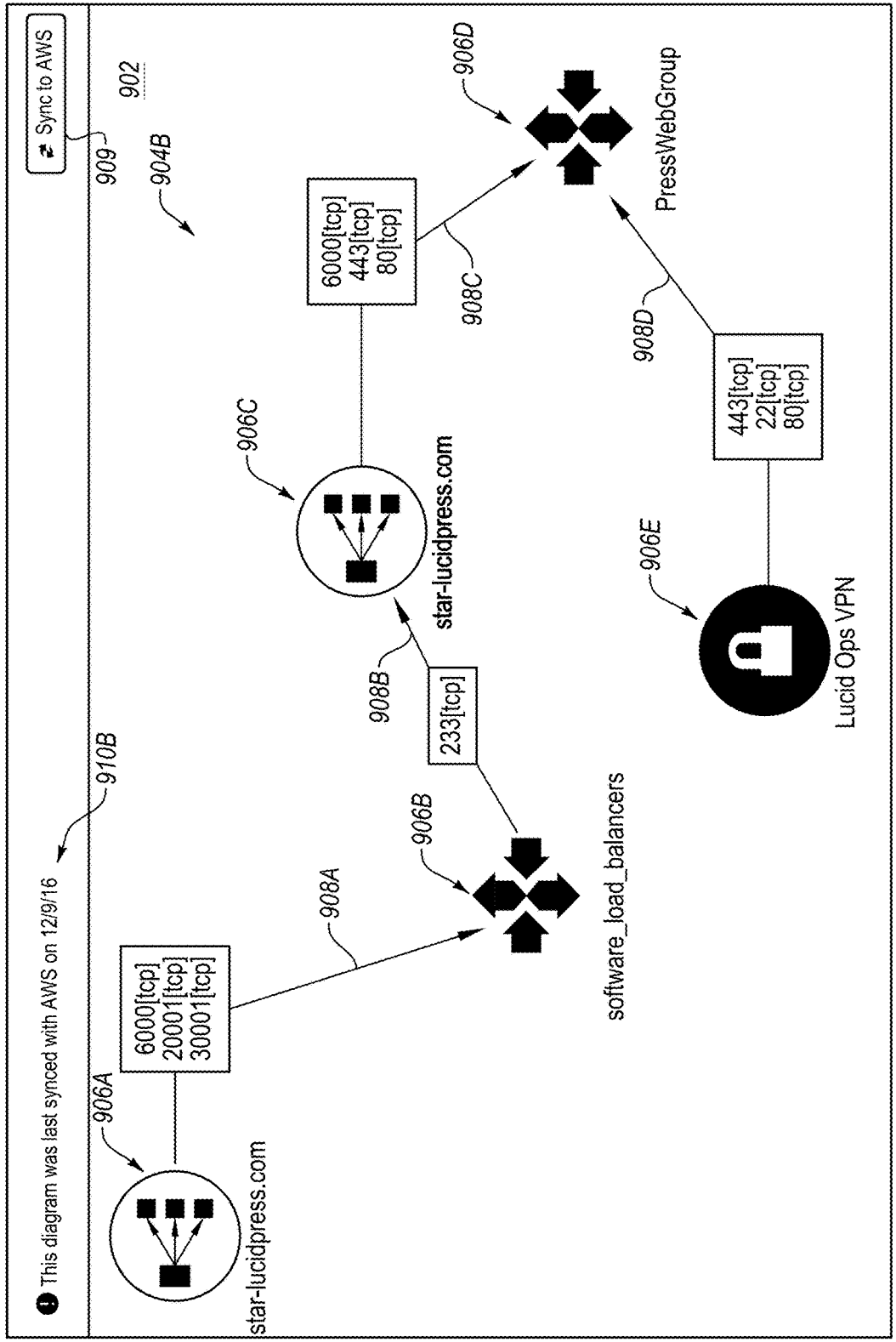

The sync button 909 of FIGS. 9A and 9D may be selected by a user to request that the initial graphical diagram 904A of FIGS. 9A and 9B be checked for updates against the structured data.

The timestamps 910 of FIGS. 9A and 9D may indicate a last time the graphical diagrams 904 were synched with the corresponding source data, which may in effect identify a version of the structured data from which the graphical diagrams 904 were generated. For instance, the timestamp 910A of FIG. 9A indicates that the initial graphical diagram 904A was last synched on a first date ("11/1/16" in FIG. 9A), while the timestamp 910B of FIG. 9D indicates the current graphical diagram 904B was last synched on a second date ("12/9/16" in FIG. 9D) that is after the first date.

The discrepancy alerts 912A-912C (collectively "discrepancy alerts 912") of FIGS. 9B and 9C may indicate that the initial graphical diagram 904A of FIGS. 9A and 9B is outdated in some respect compared to the current version of the source data. In the example of FIGS. 9B and 9C, the discrepancy alert 912A is a text output that describes a number of discrepancies between the nodes 906 and/or relationships 908 displayed in the initial graphical diagram 904A and the current version of the structured data. The discrepancy alert 912B highlights the second relationship 908B as being one of the discrepancies, while the discrepancy alert 912C highlights the fourth node 906D as being another one of the discrepancies.

The buttons 914A and 914B (collectively "buttons 914") of FIGS. 9B and 9C may be selected to toggle between the initial graphical diagram 904A of FIGS. 9A and 9B and the current graphical diagram 904B of FIGS. 9C and 9D.

The button 916 of FIG. 9B may be selected to update the current version of the structured data consistent with the initial graphical diagram 904A of FIGS. 9A and 9B.

The button 918 of FIG. 9C may be selected to replace the initial graphical diagram 904A of FIGS. 9A and 9B with the current graphical diagram 904B of FIGS. 9C and 9D.

Referring to FIGS. 8 and 9A, the example implementation of the method 800 includes, at block 802, displaying the initial graphical diagram 904A of multiple nodes 906 and their relationships 908 based on an initial version of structured data about the nodes 906 and their relationships 908.

A client device on which the graphical drawing canvas 902 is displayed may receive input effective to request that the initial graphical diagram 904A be checked for updates against the structured data. For instance, the client device may receive a selection by the user of the sync button 909 of FIG. 9A.

In response to receiving the input, the example implementation of the method 800 also includes, at block 804, determining that the current version of the structured data is updated compared to the initial version of the structured data with respect to at least one of the nodes 906 or their relationships 906. In particular, as seen by comparing FIGS. 9B and 9C, it is determined in this example implementation that the second relationship 908B has been updated with a different port than previously and the fourth node 906D has been updated with a different name than previously. The client device (e.g., client device 104) and/or a server (e.g., the server 102) may generate the current graphical diagram 904B of FIGS. 9C and 9D automatically in response to determining that the current version of the structured data is updated.

Referring to FIGS. 8, 9B, and 9C, the example implementation of the method 800 may also include, at block 806, and in response to determining that the current version of the structured data is updated compared to the initial version of the structured data, outputting the discrepancy alerts 912 to indicate that the initial graphical diagram 904A of FIGS. 9A and 9B is outdated. The discrepancy alert 912A includes text output that describes the number of discrepancies, while the discrepancy alerts 912B, 912C highlight the particular second relationship 908B and fourth node 906D affected by the discrepancies.

As illustrated in FIG. 9B, the initial graphical diagram 904A may be displayed in response to selection of the button 914B, with the current graphical diagram 904B being obscured. As illustrated in FIG. 9C, the current graphical diagram 904B may be displayed in response to selection of the button 914A, with the initial graphical diagram 904A being obscured. In other embodiments, both the initial graphical diagram 904A and the current graphical diagram 904B may be displayed simultaneously, e.g., side by side in different graphical diagram canvases 902.

When the initial graphical diagram 904A is displayed as in FIG. 9B, the button 916 of FIG. 9B may be selected to update the current version of the structured data consistent with the initial graphical diagram 904A.

When the current graphical diagram 904B is displayed as in FIG. 9C, the button 918 of FIG. 9C may be selected to update the initial graphical diagram 904A of FIGS. 9A and 9B consistent with the current version of the structured data.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to filter a graphical diagram, the method comprising:
  displaying, on a display device, a graphical diagram of nodes and their relationships based on structured data about the nodes and their relationships, wherein displaying the graphical diagram comprises:

displaying a first node of the nodes in a graphical drawing canvas;

receiving input effective to request a list of a first subset of the nodes that have pre-existing relationships with the first node, the pre-existing relationships existing prior to the receiving the input;

analyzing the structured data to identify the first subset of the nodes, where each node in the first subset of the nodes is related to the first node with a corresponding pre-existing relationship defined in the structured data;

in response to the receiving the input, displaying a user interface overlay over the graphical drawing canvas that lists the first subset of the nodes;

receiving a second input effective to select a second node, of the first subset of the nodes, from the user interface overlay; and in response to the receiving the second input, generating and displaying the graphical diagram of the nodes and connectors connecting at least a plurality of the nodes in the graphical drawing canvas, including generating and displaying the first node as a first icon, the second node as a second icon, and a first connector of the connectors between the first icon and the second icon as a representation that the second node is related to the first node with the corresponding pre-existing relationship, the corresponding pre-existing relationship comprising wherein the second node is communicatively coupled to the first node;

wherein the graphical diagram is based on the structured data about the nodes and the connectors, wherein additional information about the corresponding pre-existing relationship is included in the first connector and comprises multiple ports by which the first and second nodes may communicate with each other;

receiving a third input effective to specify a filter parameter, the third input comprising user entry into a search field;

analyzing the nodes displayed in the graphical diagram on the display device based on the filter parameter to identify a second subset of the nodes that satisfy the filter parameter and a third subset of the nodes that fail to satisfy the filter parameter; and altering the graphical diagram displayed on the display device in accordance with the filter parameter, including altering the graphical diagram to visually distinguish between the second subset of the nodes that satisfy the filter parameter and the third subset of the nodes that fail to satisfy the filter parameter.

2. The method of claim 1, wherein: analyzing the nodes displayed in the graphical diagram includes analyzing tags of the nodes; the tags are included in the structured data; and the second subset of the nodes includes at least one node with a tag that satisfies the filter parameter.

3. The method of claim 1, further comprising displaying a textual list that lists either the second subset of the nodes that satisfy the filter parameter or the third subset of the nodes that fail to satisfy the filter parameter.

4. The method of claim 1, wherein altering the graphical diagram in accordance with the filter parameter includes emphasizing the second subset of the nodes that satisfy the filter parameter relative to the third subset of the nodes that fail to satisfy the filter parameter.

5. The method of claim 1, wherein altering the graphical diagram in accordance with the filter parameter includes deemphasizing the third subset of the nodes that fail to satisfy the filter parameter relative to the second subset of the nodes that satisfy the filter parameter.

6. The method of claim 1, wherein altering the graphical diagram in accordance with the filter parameter includes altering each node of the third subset of the nodes that fail to satisfy the filter parameter to be greyed out.

7. The method of claim 6, wherein altering the graphical diagram in accordance with the filter parameter further includes rearranging the nodes so the second subset of the nodes that satisfy the filter parameter are consolidated together.

8. The method of claim 1, further comprising, prior to displaying the first node of the nodes in the graphical drawing canvas: displaying a panel beside the graphical drawing canvas with a second list of at least some of the nodes in the panel; and receiving a fourth input effective to drag and drop the first node from the second list in the panel to the graphical drawing canvas, wherein the first node is displayed in the graphical drawing canvas in response to receiving the fourth input.

9. The method of claim 1, wherein the graphical diagram includes an initial graphical diagram and the structured data includes an initial version of the structured data, the initial graphical diagram being based on the initial version of the structured data, the method further comprising: determining that a current version of the structured data is updated compared to the initial version of the structured data with respect to at least one of the nodes or the pre-existing relationships; and in response to determining that the current version of the structured data is updated compared to the initial version of the structured data, outputting an indication that the initial graphical diagram of the nodes and their pre-existing relationships is outdated.

10. A method to update a graphical diagram, the method comprising:

displaying a first node of nodes in a graphical drawing canvas;

receiving input effective to request a list of a first subset of the nodes that have pre-existing relationships with the first node, the pre-existing relationships existing prior to the receiving the input;

analyzing an initial version of structured data to identify the first subset of the nodes, where each node in the first subset of the nodes is related to the first node with a corresponding pre-existing relationship defined in the structured data;

in response to the receiving the input, displaying a user interface overlay over the graphical drawing canvas that lists the first subset of the nodes;

receiving a second input effective to select a second node, of the first subset of the nodes, from the user interface overlay;

in response to the receiving the second input, generating and displaying an initial graphical diagram of the nodes and connectors connecting at least a plurality of the nodes in the graphical drawing canvas, including generating and displaying the first node as a first icon, the second node as a second icon, and a first connector of the connectors between the first icon and the second icon as a representation that the second node is related to the first node with the corresponding pre-existing relationship, the corresponding pre-existing relationship comprising wherein the second node is communicatively coupled to the first node;

wherein the initial graphical diagram is based on the initial version of structured data about the nodes and the connectors, wherein additional information about the corresponding pre-existing relationship is included in the first connector and comprises multiple ports by which the first and second nodes may communicate with each other;

determining that a current version of the structured data is updated compared to the initial version of the structured data with respect to at least one of the nodes or the connectors; and in response to determining that the current version of the structured data is updated compared to the initial version of the structured data, outputting a visual indication on the display device that the initial graphical diagram of the nodes and the connectors is outdated.

11. The method of claim 10, further comprising, prior to the determining, receiving a third input effective to request that the initial graphical diagram be checked for updates against the structured data, wherein the determining occurs in response to the receiving the third input.

12. The method of claim 10, wherein the outputting the visual indication includes outputting at least one of a text output describing a number of discrepancies between the nodes or connectors displayed in the initial graphical diagram and the current version of the structured data or a text output describing each of the discrepancies.

13. The method of claim 10, wherein the outputting the visual indication includes highlighting at least one of the nodes or connectors displayed in the initial graphical diagram that, relative to the initial version of the structured data, is modified or deleted in the current version of the structured data.

14. The method of claim 10, further comprising: generating a current graphical diagram of the nodes and connectors based on the current version of the structured data, wherein the current graphical diagram includes at least one difference compared to the initial graphical diagram; outputting on a display a first user interface button effective to display the initial graphical diagram and a second user interface button effective to display the current graphical diagram; receiving user input effective to select one of the first or second user interface buttons; displaying the initial graphical diagram and obscuring the current graphical diagram in response to receiving input effective to select the first user interface button; and displaying the current graphical diagram and obscuring the initial graphical diagram in response to receiving user input effective to select the second user interface button.

15. The method of claim 14, wherein displaying the current graphical diagram that includes the at least one difference includes at least one of: displaying an updated node or connector that is updated in the current version of the structured data compared to the initial version of the structured data; displaying a new node or connector from the current version of the structured data that is absent from the initial version of the structured data; or omitting a deleted node or connector that is deleted from the current version of the structured data compared to the initial version of the structured data.

16. The method of claim 14, further comprising: outputting on the display a diagram update user interface button effective to update the initial graphical diagram consistent with the current version of the structured data; receiving input effective to select the diagram update user interface button; and updating the initial graphical diagram consistent with the current version of the structured data, including modifying the initial graphical diagram to match the current graphical diagram.

17. The method of claim 14, further comprising: outputting on the display a source data update user interface button effective to update the current version of the structured data consistent with the initial graphical diagram; receiving input effective to select the source data update user interface button; and updating the current version of the structured data consistent with the initial graphical diagram, including modifying the current version of the structured data at its source to match the initial version of the structured data at least with respect to each of the nodes and connectors in the initial graphical diagram.

18. The method of claim 10, further comprising, prior to displaying the first node of the nodes in the graphical drawing canvas: displaying a panel beside the graphical drawing canvas with a second list of at least some of the nodes in the panel; and receiving a third input effective to drag and drop the first node from the second list in the panel to the graphical drawing canvas, wherein the first node is displayed in the graphical drawing canvas in response to the receiving the third input.

19. The method of claim 10, further comprising: receiving input effective to specify a filter parameter; analyzing the nodes displayed in the initial graphical diagram to identify a second subset of the nodes that satisfy the filter parameter and a third subset of the nodes that fail to satisfy the filter parameter; and altering the initial graphical diagram in accordance with the filter parameter.

20. The method of claim 10, further comprising: receiving input effective to specify a filter parameter; analyzing the nodes displayed in the initial graphical diagram to identify a second subset of the nodes that satisfy the filter parameter and a third subset of the nodes that fail to satisfy the filter parameter; and outputting a textual list that includes the second subset of the nodes that satisfy the filter parameter.

21. A method to add nodes to a graphical diagram, the method comprising:

displaying a first node of nodes in a graphical drawing canvas;

receiving input effective to request a list of a subset of the nodes that have pre-existing relationships with the first node, the pre-existing relationships existing prior to the receiving the input;

analyzing structured data of the nodes to identify the subset of the nodes, where each node in the subset of the nodes is related to the first node with a corresponding pre-existing relationship defined in the structured data;

in response to the receiving the input, displaying a user interface overlay over the graphical drawing canvas that lists the subset of the nodes;

receiving a second input effective to select a second node, of the subset of nodes, from the user interface overlay; and in response to the receiving the second input, generating and displaying a graphical diagram of the nodes and connectors connecting at least a plurality of the nodes in the graphical drawing canvas, including generating and displaying the first node as a first icon, the second node as a second icon, and a first connector of the connectors between the first icon and the second icon as a representation that the second node is related to the first node with the corresponding pre-existing relationship, the corresponding pre-existing relationship comprising wherein the second node is communicatively coupled to the first node, wherein the graphical diagram is based on the structured data about the nodes and connectors, wherein additional information about the corresponding pre-existing relationships is included in the first connector and comprises multiple ports by which the first and second nodes may communicate.

22. The method of claim 21, wherein analyzing the structured data comprises: applying model rules and heuristics to the structured data; and generating a structured data model derived by the model rules and heuristics, wherein the structured data model corresponds to a set of structured data.

* * * * *